United States Patent
Park et al.

(10) Patent No.: US 10,848,971 B2
(45) Date of Patent: Nov. 24, 2020

(54) METHOD AND DEVICE FOR DOWNLOADING PROFILE IN MOBILE COMMUNICATION SYSTEM

(71) Applicant: Samsung Electronics Co., Ltd., Suwon-si, Gyeonggi-do (KR)

(72) Inventors: Jonghan Park, Bucheon-si (KR); Duckey Lee, Seoul (KR); Sangsoo Lee, Suwon-si (KR); Hyewon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/740,677

(22) Filed: Jan. 13, 2020

(65) Prior Publication Data

US 2020/0162893 A1  May 21, 2020

Related U.S. Application Data

(63) Continuation of application No. 15/760,454, filed as application No. PCT/KR2016/010343 on Sep. 13, 2016, now Pat. No. 10,536,844.

(30) Foreign Application Priority Data

Sep. 22, 2015  (KR) .......................... 10-2015-0134096

(51) Int. Cl.
*H04W 8/24* (2009.01)
*H04W 12/06* (2009.01)
(Continued)

(52) U.S. Cl.
CPC ............. *H04W 12/06* (2013.01); *H04W 8/20* (2013.01); *H04W 8/245* (2013.01); *H04W 88/06* (2013.01)

(58) Field of Classification Search
CPC ....... H04W 8/24; H04W 12/06; H04W 12/08; H04W 8/20; H04W 8/245; H04W 88/06
(Continued)

(56) References Cited

U.S. PATENT DOCUMENTS 9,148,841 B2    9/2015  Li et al.
9,924,357 B2 *  3/2018  Lee ...................... H04W 12/06
(Continued)

FOREIGN PATENT DOCUMENTS

CN    102804821 A    11/2012
CN    103428304 A    12/2013
(Continued)

OTHER PUBLICATIONS

Chinese Office Action dated Oct. 10, 2020, issued in Chinese Patent Application No. 201680055113.9.

*Primary Examiner* — Congvan Tran
(74) *Attorney, Agent, or Firm* — Jefferson IP Law, LLP

(57) ABSTRACT

The present invention may provide a method for downloading a profile by an electronic device and the electronic device performing the same, the method comprising: transmitting, to a routing server, profile download request-related information including profile server indication information; transmitting, to the routing server, a profile download request message including profile download identification information; and receiving a profile from the routing server, wherein the profile download request message is transmitted to a profile server, which provides a profile of the electronic device, via the routing server on the basis of the profile server indication information. Further, the present invention may provide a routing server which operates with the electronic device and an operation method of the routing server.

20 Claims, 16 Drawing Sheets

(51) Int. Cl.
*H04W 88/06* (2009.01)
*H04W 8/20* (2009.01)

(58) Field of Classification Search
USPC .................. 455/556.1–2, 558, 419–420
See application file for complete search history.

(56) References Cited

U.S. PATENT DOCUMENTS

| | | | |
|---|---|---|---|
| 10,536,844 B2* | 1/2020 | Park | H04W 12/08 |
| 2010/0311404 A1 | 12/2010 | Shi et al. | |
| 2012/0190354 A1* | 7/2012 | Merrien | H04L 63/083 |
| | | | 455/422.1 |
| 2012/0260090 A1 | 10/2012 | Hauck et al. | |
| 2013/0023235 A1 | 1/2013 | Fan et al. | |
| 2013/0301522 A1 | 11/2013 | Krishna et al. | |
| 2014/0031012 A1 | 1/2014 | Park et al. | |
| 2014/0086177 A1 | 3/2014 | Adjakple et al. | |
| 2014/0219447 A1 | 8/2014 | Park et al. | |
| 2015/0134958 A1 | 5/2015 | Merrien et al. | |
| 2015/0180847 A1* | 6/2015 | Nix | H04W 12/001 |
| | | | 713/168 |
| 2015/0349825 A1 | 12/2015 | Lee et al. | |
| 2015/0350881 A1 | 12/2015 | Weiss et al. | |
| 2016/0127132 A1 | 5/2016 | Lee et al. | |
| 2016/0174065 A1* | 6/2016 | Li | H04W 4/60 |
| | | | 455/419 |
| 2019/0053040 A1 | 2/2019 | Long | |

FOREIGN PATENT DOCUMENTS

| | | |
|---|---|---|
| DE | 20 2015 101 972 U1 | 5/2015 |
| EP | 2 747 466 A1 | 6/2014 |
| KR | 10-2013-0132295 A | 12/2013 |
| KR | 10-2014-0140820 A | 12/2014 |
| WO | 2014/092385 A1 | 6/2014 |

\* cited by examiner

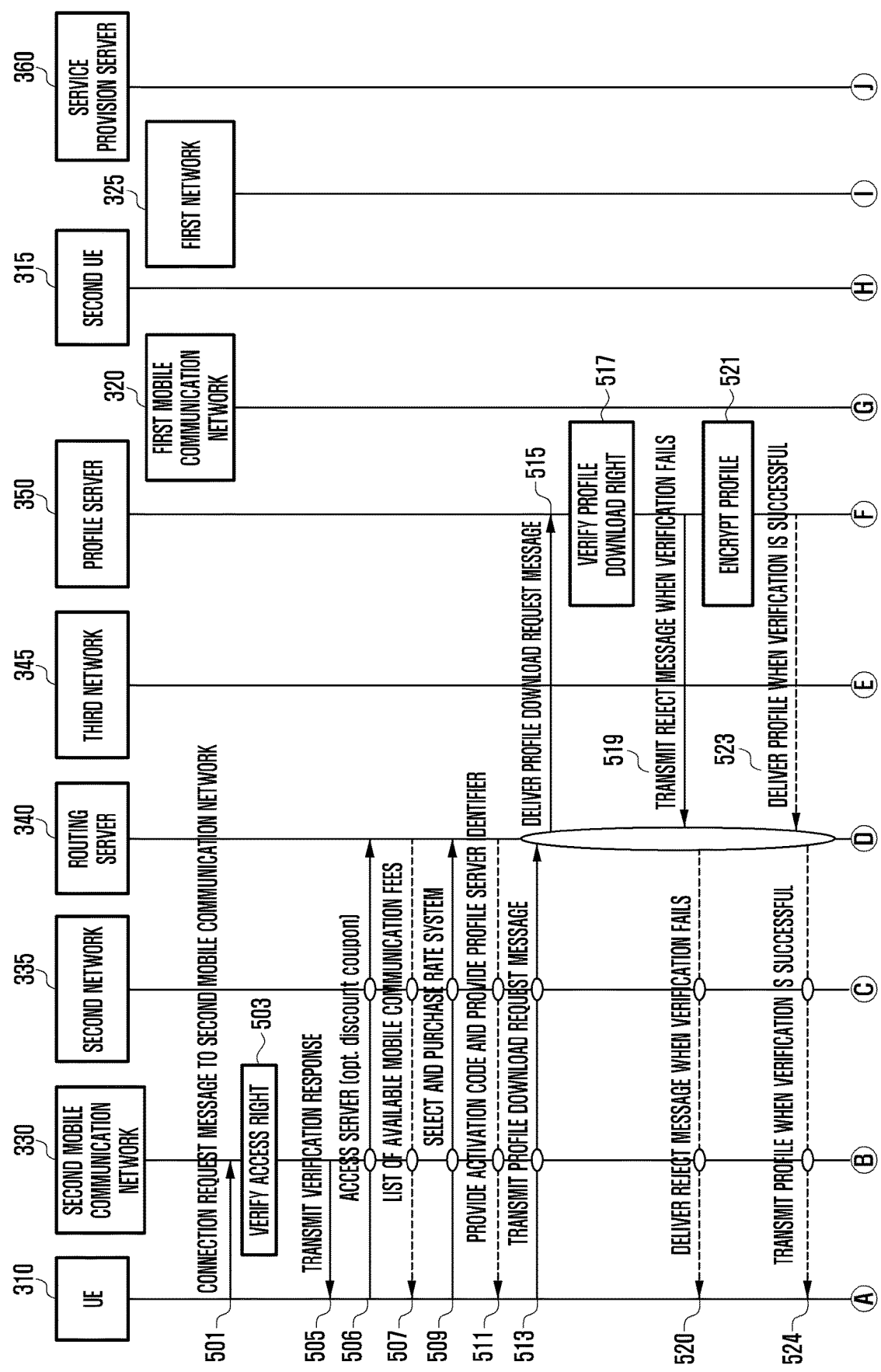

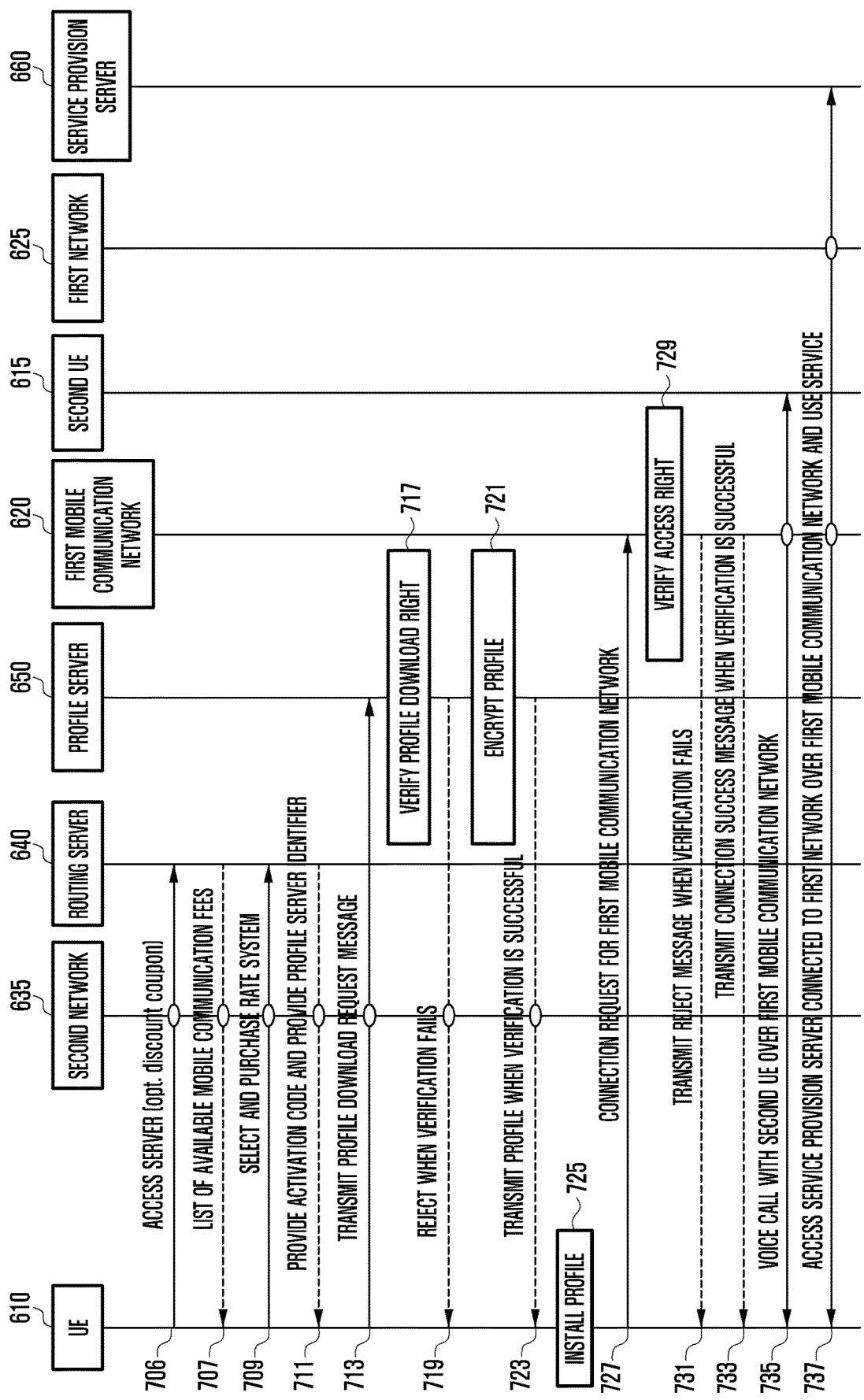

METHOD AND DEVICE FOR DOWNLOADING PROFILE IN MOBILE COMMUNICATION SYSTEM

CROSS-REFERENCE TO RELATED APPLICATION(S)

This application is a continuation application of prior application Ser. No. 15/760,454, filed on Mar. 15, 2018, which was the National Stage of International application PCT/KR2016/010343, filed on Sep. 13, 2016, which claimed priority under 35 U.S.C. § 119(a) of a Korean patent application number 10-2015-0134096, filed on Sep. 22, 2015, in the Korean Intellectual Property Office, the disclosure of each of which is incorporated by reference herein in its entirety.

TECHNICAL FIELD

The present disclosure relates to a wireless communication system and to a method and apparatus installing a profile for providing a communication service in a terminal. Furthermore, the present disclosure relates to a method and apparatus providing a profile to a terminal in a wireless communication system.

BACKGROUND ART

In order to satisfy a wireless data traffic demand that tends to increase after the 4G communication system commercialization, efforts to develop an improved 5G communication system or pre-5G communication system is being made. For this reason, the 5G communication system or pre-5G communication system is called a beyond 4G Network communication system or a post LTE system. In order to achieve a high data transfer rate, the 5G communication system is considered to be implemented in a very high frequency (mmWave) band (e.g., 60 GHz band). In order to relieve a path loss of a radio wave and increase a transfer distance of the radio wave in the very high frequency band, beamforming, massive MIMO, full dimensional MIMO (FD-MIMO), array antenna, analog beam-forming and large scale antenna technologies are being discussed in the 5G communication system. Furthermore, in order to improve the network of a system, technologies, such as an evolved small cell, an advanced small cell, a cloud radio access network (cloud RAN), an ultra-dense network, device to device communication (D2D), wireless backhaul, a moving network, cooperative communication, coordinated multi-points (CoMP) and interference cancellation, are being developed in the 5G communication system. In addition, in the 5G system, hybrid FSK and QAM modulation (FQAM) and sliding window superposition coding (SWSC) that are advanced coding modulation (ACM) schemes, and a filter bank multi-carrier (FBMC), a non-orthogonal multiple access (NOMA) and a sparse code multiple access (SCMA) that are advanced access technologies, and so on are being developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc. is combined with the IoT technology by connection with a cloud server, etc. has also emerged. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT network are being made. For example, 5G communication technologies, such as a sensor network, machine to machine (M2M) and machine type communication (MTC), are implemented by schemes, such as beamforming, MIMO, and an array antenna. The application of a cloud radio access network (cloud RAN) as the aforementioned big data processing technology may be said to be an example of convergence between the 5G technology and the IoT technology.

A mobile communication terminal may access a mobile communication network and is capable of voice communication or data communication service at a determined location or while moving. In this case, in order to provide the mobile communication terminal with the communication service, an appropriate authentication process is necessary. In general, authentication is performed between a mobile communication terminal and the server of a mobile communication company through a universal subscriber identity module (USIM) installed in a universal integrated circuit card (UICC) after the UICC is inserted into the mobile communication terminal. For example, when a customer subscribes to a mobile communication service through a mobile communication company, the mobile communication company provides the customer with a UICC card. When the customer inserts the UICC card into his or her own mobile communication terminal, a proper authentication process is performed along with the server of the mobile communication company in which the same values are stored using an IMSI value and a K value stored in an USIM application installed in the UICC card. Thereafter, the customer can use the mobile communication service. An example of the appropriate authentication process may be authentication and key agreement (AKA) authentication.

A conventional UICC card is fabricated as a dedicated card for a corresponding service provider in response to a request from a specific mobile communication service provider when the card is fabricated. Authentication information (e.g., USIM application and a subscriber identity ID (e.g., may include an international mobile subscription identifier (IMSI)) for network access of a corresponding service provider and an encryption key (e.g., it may be a K value or Ki value) are previously mounted and released. Accordingly, the fabricated UICC card is provided to a corresponding mobile communication service provider and then provided to a subscriber. Thereafter, management, such as the installation, modification and deletion of an application within the UICC, is performed using a technology, such as over the air (OTA), if necessary. The subscriber may use the network and application service of a corresponding mobile communication service provider by inserting the UICC card into the owned mobile communication terminal. If the existing terminal is replaced, the subscriber may use authentication information, a mobile communication telephone number and a personal telephone directory stored in the corresponding UICC card in a new terminal by moving the UICC card from the existing terminal to the new terminal and inserting it into the new terminal.

Meanwhile, unlike in a conventional UICC card fabricated and distributed for a dedicated specific mobile communication service provider, a scheme in which after a customer purchases or obtains a specific UICC card and subscribes to (or purchases) a mobile communication service, when the user subscribes to a specific mobile communication service provider, churns the mobile communication service provider or changes subscription to another service provider, a USIM application, a subscriber identity ID, and encryption key of the mobile communication service provider are remotely installed in the UICC card and such authentication information of various mobile communication service providers can be installed and managed safely and flexibly is sought.

DISCLOSURE OF INVENTION

Technical Problem

Various embodiments of this specification are to provide a method and apparatus for remotely installing profile information for providing a communication service to a terminal on which a UICC (including an embedded UICC (eUICC) and a detachable UICC inserted into a terminal) is mounted using a method, such as wireless communication, in a wireless communication network.

Furthermore, various embodiments of the present disclosure are to provide a method and apparatus for remotely downloading a profile from a server incapable of direct access to a limited network in the situation of a terminal capable of accessing the limited network to which access is limited through only a specific server or specific access band (e.g. an IP or URL) in a process of remotely installing profile information and remotely installing the downloaded profile.

Solution to Problem

In accordance with an embodiment of the present disclosure, there may be provided a method for an electronic device to download a profile, including the steps of transmitting profile download request-related information including profile server indication information to a routing server, transmitting a profile download request message including profile download identification information to the routing server, and receiving a profile from the routing server, wherein the profile download request message is delivered to a profile server providing the profile of the electronic device via the routing server based on the profile server indication information.

Furthermore, in accordance with an embodiment of the present disclosure, there may be provided an electronic device for profile download, including a communication unit transmitting and receiving a signal, a universal integrated circuit card (UICC) for profile download and installation, and a controller controlling to transmit profile download request-related information including profile server indication information to a routing server, to transmit a profile download request message including profile download identification information to the routing server and to receive a profile from the routing server, wherein the profile download request message is delivered to a profile server providing the profile of the electronic device via the routing server based on the profile server indication information.

Furthermore, in accordance with an embodiment of the present disclosure, there may be provided a method for a routing server to provide a profile, including the steps of receiving profile download request-related information including profile server indication information from an electronic device, receiving a profile download request message including profile download identification information from the electronic device, delivering the profile download request message to a profile server based on the profile server indication information, receiving the profile of the electronic device from the profile server, and delivering the received profile to the electronic device.

Furthermore, in accordance with an embodiment of the present disclosure, there may be provided a routing server for providing a profile, including a communication unit transmitting and receiving a signal and a controller controlling to receive profile download request-related information including profile server indication information from an electronic device, receive a profile download request message including profile download identification information from the electronic device, deliver the profile download request message to a profile server based on the profile server indication information, receive the profile of the electronic device from the profile server, and deliver the received profile to the electronic device.

Advantageous Effects of Invention

In accordance with an embodiment of this specification, there can be provided a method and apparatus installing a profile in a UE in a wireless communication system. Furthermore, in accordance with an embodiment of this specification, there can be provided a method and apparatus providing a profile to a UE in a wireless communication system.

In accordance with an embodiment of this specification, there can be provided a method and apparatus for a UE whose access to a network access band is limited to download a profile from servers not included in an access band. Furthermore, in accordance with an embodiment of this specification, there can be provided a method and apparatus for a UE not having a limited network access band to download a profile from server.

In accordance with an embodiment of this specification, the opening of a communication service for a UICC UE can be rapidly processed.

BRIEF DESCRIPTION OF DRAWINGS

FIG. 5A is a diagram showing a flow of a communication service provided by a mobile communication system according to another embodiment of the present disclosure.

FIG. 7 is a diagram showing a flow of a communication service provided by the mobile communication system according to the embodiment of FIG. 6 of the present disclosure.

MODE FOR THE INVENTION

Figure 1:
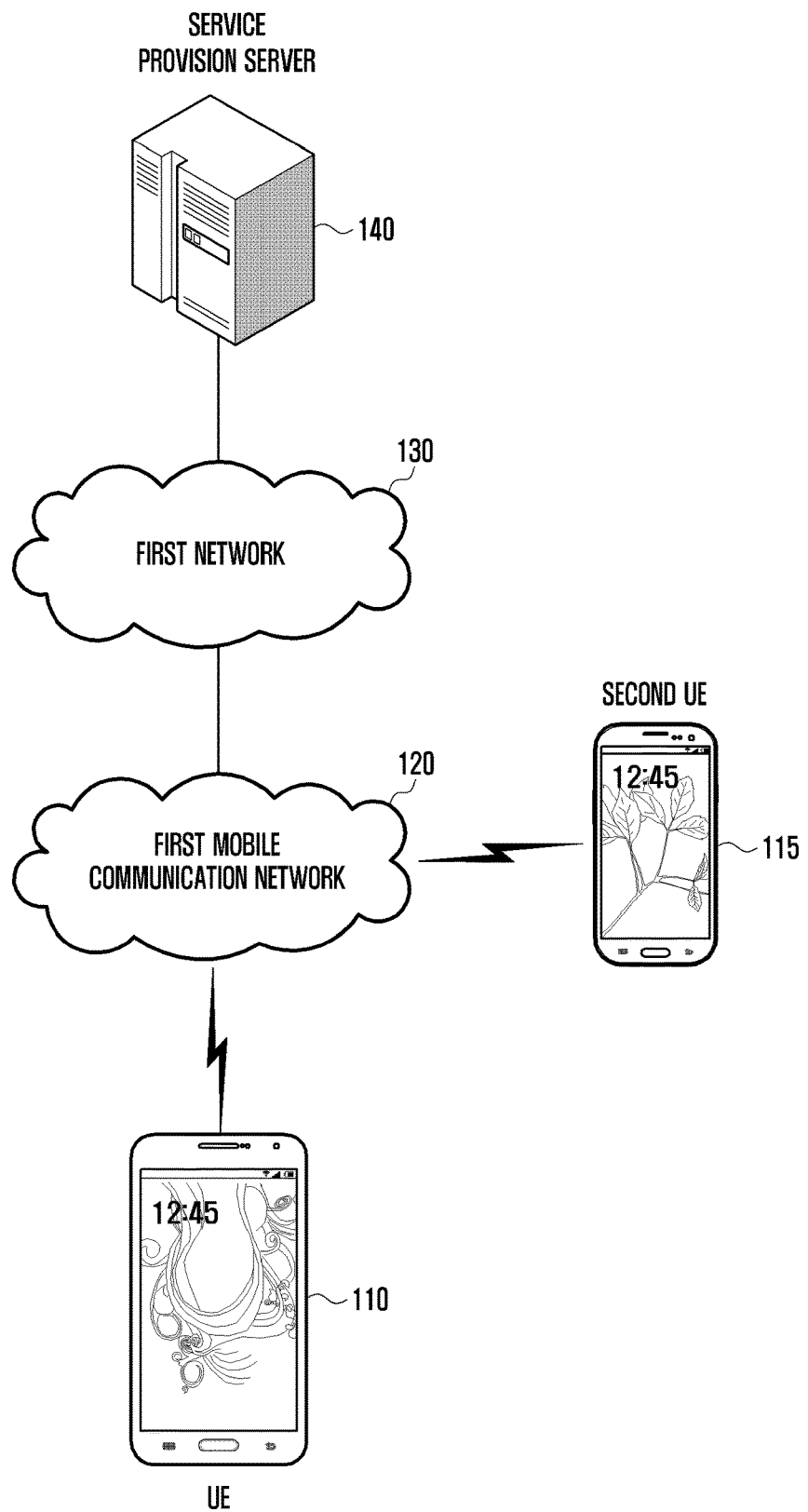
FIG. 1 is a diagram showing the configuration of a mobile communication system for providing a mobile communication service.

Hereinafter, embodiments of the present disclosure are described in detail with reference to the accompanying drawings.

In this specification, in describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. The same reference numerals will be used to refer to the same or similar elements throughout the drawings.

In the present disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more CPUs within a device or a security multimedia card.

In the following description, in describing the present disclosure, a detailed description of a related known function or configuration will be omitted if it is deemed to make the gist of the present disclosure unnecessarily vague. Embodiments of the present disclosure are described in detail with reference to the accompanying drawings.

First, terms used in this specification are described. Terms used in the embodiments of this specification may be defined depending on terms used by a person having ordinary skill in the art, but if a term is related to an embodiment of this specification, the operation or properties of the term may be described depending on a term used in this specification.

Furthermore, in this specification, the UICC covers a UICC functionally similar to the eUICC capable of downloading and installing a profile, but may physically include a UICC detachably mounted on a terminal or embedded in a terminal.

For example, the UICC is a smart card inserted into a mobile communication terminal, and may mean a chip in which personal information, such as network access authentication information, a telephone directory and SMS of a mobile communication subscriber, is stored and which enables safe use of mobile communication by performing subscriber authentication and traffic security key generation when the chip is connected to a mobile communication network, such as GSM, WCDMA or LTE. Communication applications, such as a subscriber identification module (SIM), a universal SIM (USIM), and an IP multimedia SIM (ISIM), are mounted on the UICC depending on the type of mobile communication network accessed by a subscriber. Furthermore, the UICC may provide a security function of a high level for the mounting of various applications, such as an electronic wallet, ticketing, and an electronic password.

For example, an embedded UICC (eUICC), that is, an example of the UICC, is assumed to be a security module of a chip form, which is embedded in a terminal and cannot be detached, but an embodiment of this specification may be identically applied to a UICC which is fabricated in the existing UICC form in such a way as to be detachable and has the same electrical and software characteristics as the eUICC if the UICC has no functional difference from the eUICC.

Furthermore, in this specification, the UICC or the eUICC may be called an electronic device or a small-sized electronic device. An electronic device including the UICC or eUICC may include a control for processing a signal, memory for storing a profile, and an interface unit for access to a terminal if the electronic device is fabricated to be detachable to/from the terminal, although it will be described in the drawing of a corresponding part.

The UICC according to an embodiment of the present invention may download and install a profile using a common IP network, such as a wireless communication network or WiFi. Various embodiments of the present disclosure may be applied regardless of the type of a network over which a profile is downloaded.

In this specification, the profile may mean a profile in which at least one of an application, a file system and authentication key value stored in the UICC has been packaged in a software form.

In this specification, a USIM profile may have the same meaning as a profile or may mean that information included in a USIM application within the profile has been packaged in a software form.

In this specification, a profile server may be expressed as a server, including a subscription manager (SM), subscription manager Plus (SM+), subscription manager data preparation plus (SM-DP+), a profile delivery platform, a profile delivery server, subscription manager data preparation (SM-DP) and subscription manager secure routing plus (SM-SR+). The profile server may be internally implemented as a plurality of physical servers. For example, the profile server may be internally divided into an SM-DP server and an SM-SR+ server and implemented. The profile server may transmit an encrypted profile to a terminal when Credential transmitted by the terminal is successfully verified. The Credential may be Credential for verifying the profile download right of the terminal.

In this specification, a routing server may be a server previously configured in a terminal. The pre-configured server may be configured when the terminal is fabricated or when the initial operation of the terminal starts. Furthermore, when the terminal starts an operation for profile download, the server may be configured. The routing server sets up a routing session and delivers a communication packet for the profile download of the terminal to a profile server. The name of the routing server denoted in this specification is merely an expression that represents the function of the routing server, and it is to be noted that the function may be implemented in any server apparatus having a network function.

In this specification, a mobile communication network, that is, an object over which a message or information is transmitted/received, may be a specific node of a mobile communication network. For example, the mobile communication network may be a base station, subscriber information management node or mobility management node of a mobile communication network.

In this specification, the mobile communication network may include a home location register (HLR) and authentication center (AuC) server which accesses a terminal and performs a subscriber authentication function, and includes a network and server capable of providing voice communication or data communication through access after authentication.

A term "terminal" used in this specification may be denoted as a mobile station MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile or other terms. In this specification, if a terminal is denoted unless otherwise classified, it may include a thing into which an UICC is inserted in a socket form and which includes even the UICC or may include all of things embedded into the terminal like an eUICC. Furthermore, if a UE is connected with the help of a separate communication device using a technology, such as a Bluetooth SIM access profile between the UE and a UICC, an electronic device including even the corresponding UICC may be called a UE.

Various embodiments of a UE may include a cellular telephone, a smartphone having a wireless communication function, a tablet having a wireless communication function, a wearable device having a wireless communication function, portable digital assistants (PDA) having a wireless communication function, a wireless modem, a portable computer having a wireless communication function, a photographing device, such as a digital camera having a wireless communication function, a gaming device having a wireless communication function, music storage and playback home appliances having a wireless communication function, Internet home appliances capable of wireless Internet access and browsing, and a portable unit or terminals in which combinations of such functions have been integrated. Furthermore, a measuring device having a communication function may also be included in the UE.

Furthermore, in this specification, a UE may include a machine to machine (M2M) terminal or a machine type communication (MTC) terminal/device, but is not limited thereto.

In this specification, a profile identifier may be expressed as a factor matched with profile identification information, a profile ID, an integrated circuit card ID (ICCID) or an issuer security domain-profile (ISD-P). For example, the profile ID may indicate a unique identifier of each profile. The profile identifier may be used to identify a profile in a network.

In this specification, a UICC identifier may be expressed as a unique identifier a UICC for a UE, a UICC identifier or an EID (eUICC ID).

Hereinafter, a UICC which downloads and installs a profile is collectively called an eUICC, for convenience of description.

FIG. 1 is a diagram showing the configuration of a mobile communication system for providing a mobile communication service.

Referring to FIG. 1, the mobile communication system of FIG. 1 may include at least one of a UE 110, a first mobile communication network 120, a second UE 115, a first network 130, and a service provision server 140.

The UE 110 has a first Credential for accessing the first mobile communication network 120. In this case, the Credential may be information stored in a UICC card included in the UE 110 or may be information stored in an embedded secure element (eSE) embedded in the UE. The Credential may refer to an IMSI, K or Ki value or may refer to a calculation value obtained by calculating one or more of an IMSI, K and Ki values.

The first mobile communication network 120 includes a server and mobile communication network themselves which enable a mobile communication network to be used if the Credential stored in the UE 110 is successfully verified. The first mobile communication network 120 may provide a voice call or data communication or both a voice call and data communication to the UE 110. In the case of data communication, data communication to the service provision server 140 outside the mobile communication network through the first network 130 in addition to data communication within the mobile communication network may be provided.

The first network 130 refers to a network connected to the first mobile communication network and also connected to the service provision server 140. The first network 130 may refer to a network to which one or a plurality of networks has been connected.

The service provision server 140 refers to a server providing a data service while operating in conjunction with the UE 110 over the first network. An example of the data service may be an Internet search function.

The second UE 115 is a device accessing the first mobile communication network 120 and capable of a voice call with the UE 110. If the UE 110 is a UE not having a voice call function, the second UE 115 may be omitted from the configuration of the system.

Figure 2:
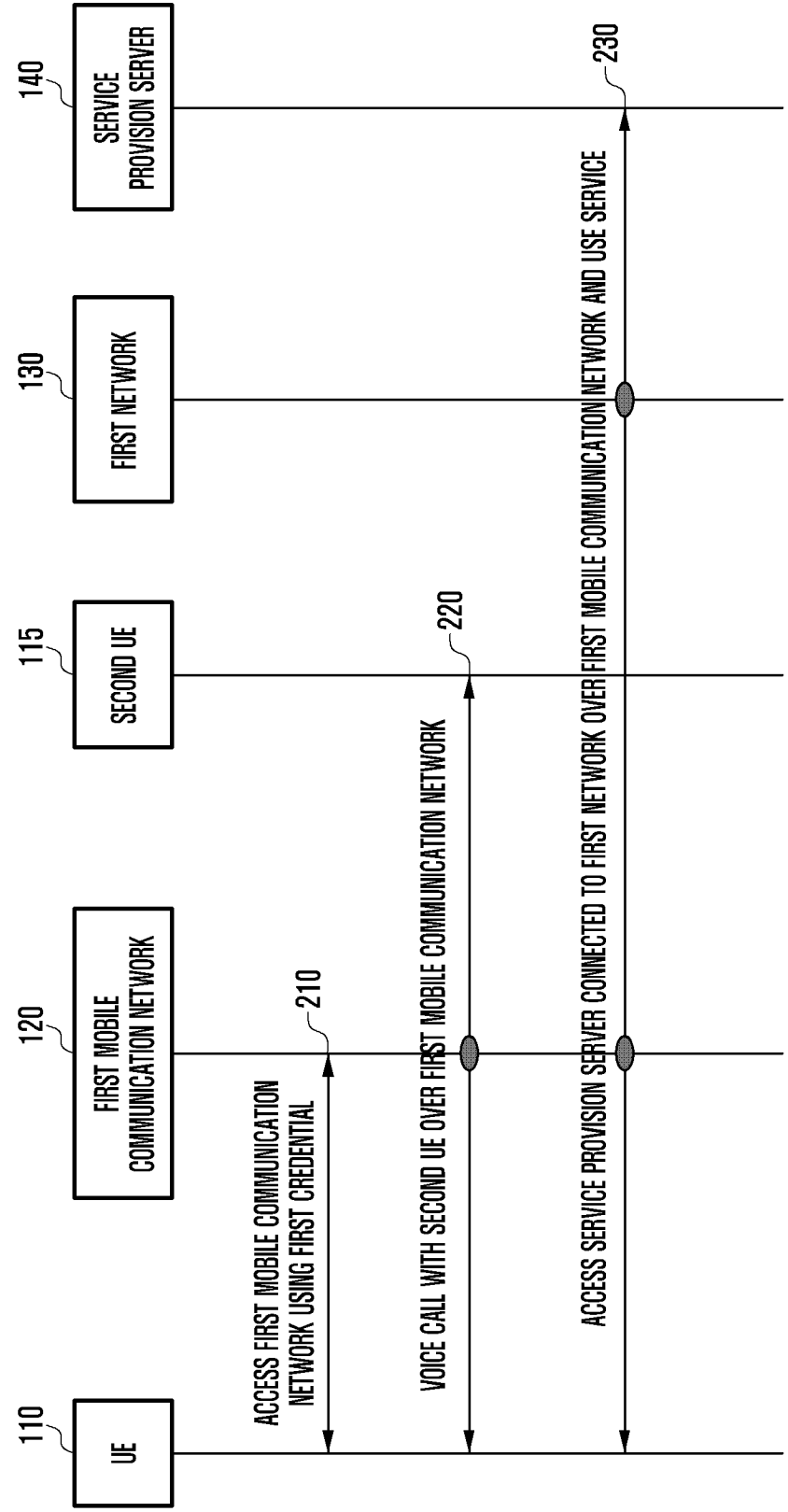
FIG. 2 is a diagram showing a flow of a communication service provided by a mobile communication system.

FIG. 2 is a diagram showing a flow of a communication service provided by a mobile communication system.

Referring to FIG. 2, a mobile communication system may include at least one of the UE 110, the first mobile communication network 120, the second UE 115, the first network 130, and the service provision server 140.

At operation 210, the UE 110 may access the first mobile communication network 120 through communication with the first mobile communication network 120. In this case, the UE 110 may send the aforementioned Credential to the first mobile communication network 120. The first mobile communication network 120 may determine whether or not to permit the access of the UE 110 to the first mobile communication network 120 by verifying the received first credential.

If access to the first mobile communication network 120 is permitted, the UE 110 may use a voice call with the second UE 115 over the first mobile communication network 120 (operation 220) or may access the first network 130 over the first mobile communication network 120, may access the service provision server 140 and may be provided with services (operation 230).

The aforementioned mobile communication system has problems in that a UICC card must be replaced in order to access the mobile communication network of another service provider in such a manner that the Credential of a specific mobile communication company is mounted on a UICC or an eSE embedded in a UE and services is provided by accessing the mobile communication network of the corresponding mobile communication company and an eSE chip must be replaced in order to change a service provider in the case of an eSE embedded in a UE.

Figure 3:
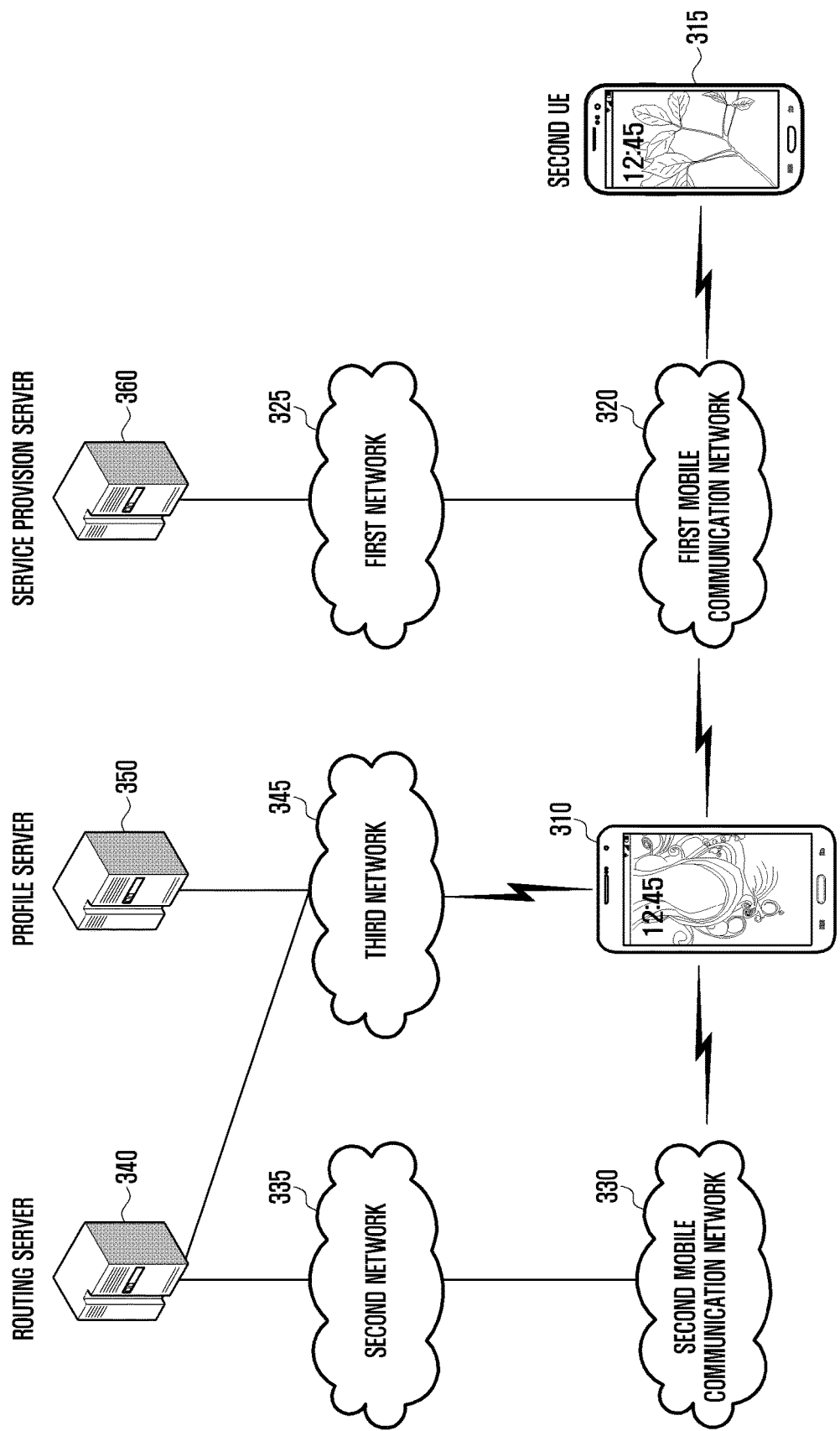
FIG. 3 is a diagram showing the configuration of a mobile communication system for providing a mobile communication service according to an embodiment of the present disclosure.

FIG. 3 is a diagram showing the configuration of a mobile communication system for providing a mobile communication service according to an embodiment of the present disclosure.

Referring to FIG. 3, the mobile communication system may include at least one of a UE 310, a first mobile communication network 320, a first network 325, a second mobile communication network 330, a second network 335, a routing server 340, a profile server 350, a service provision server 360, a third network 345 and a second UE 315.

A communication method of an embodiment of FIG. 3 is a method using a mobile communication network, including the UE 310 having a first Credential, the second mobile communication network 330 determining whether or not to permit access to a mobile communication network using the first Credential, the second network 335 that may be additionally accessed if access to the second mobile communication network is possible, the routing server 340 capable of being accessed over the second network 335 and determining whether or not to permit routing using the second Credential of the UE, the profile server 350 capable of being accessed over the third network 345 that the routing server 340 may access and of being accessed by the routing server 340 over the third network 345 and determining whether or not to provide a profile included in a fourth Credential using the third Credential of the UE 310, the first mobile communication network 320 determining whether or not to permit access to the mobile communication network using the fourth Credential, the service provision server 360 capable of being accessed over the first network 325 that may be additionally accessed if access to the first mobile communication network 320 is possible and the first network 325 that may be accessed over the first mobile communication network 320, and the second UE 315 capable of communication over the first mobile communication network 320.

Referring to FIG. 3, the UE 310 may access the third network 345 through Internet access, such as WiFi or Bluetooth (BT), but if the UE 310 accesses the second mobile communication network 330 only, access to the third network 345 may be limited. A method for the UE 310 to access the routing server 340 may be a method for the UE 310 to use a predetermined Internet protocol (IP) address or a uniform resource locator (URL). For example, the address of the routing server 340 may have been stored in the UE 310. For another example, the address of a server that notifies the UE 310 of the address of the routing server 340 may have been stored in the UE 310.

Figure 4A:
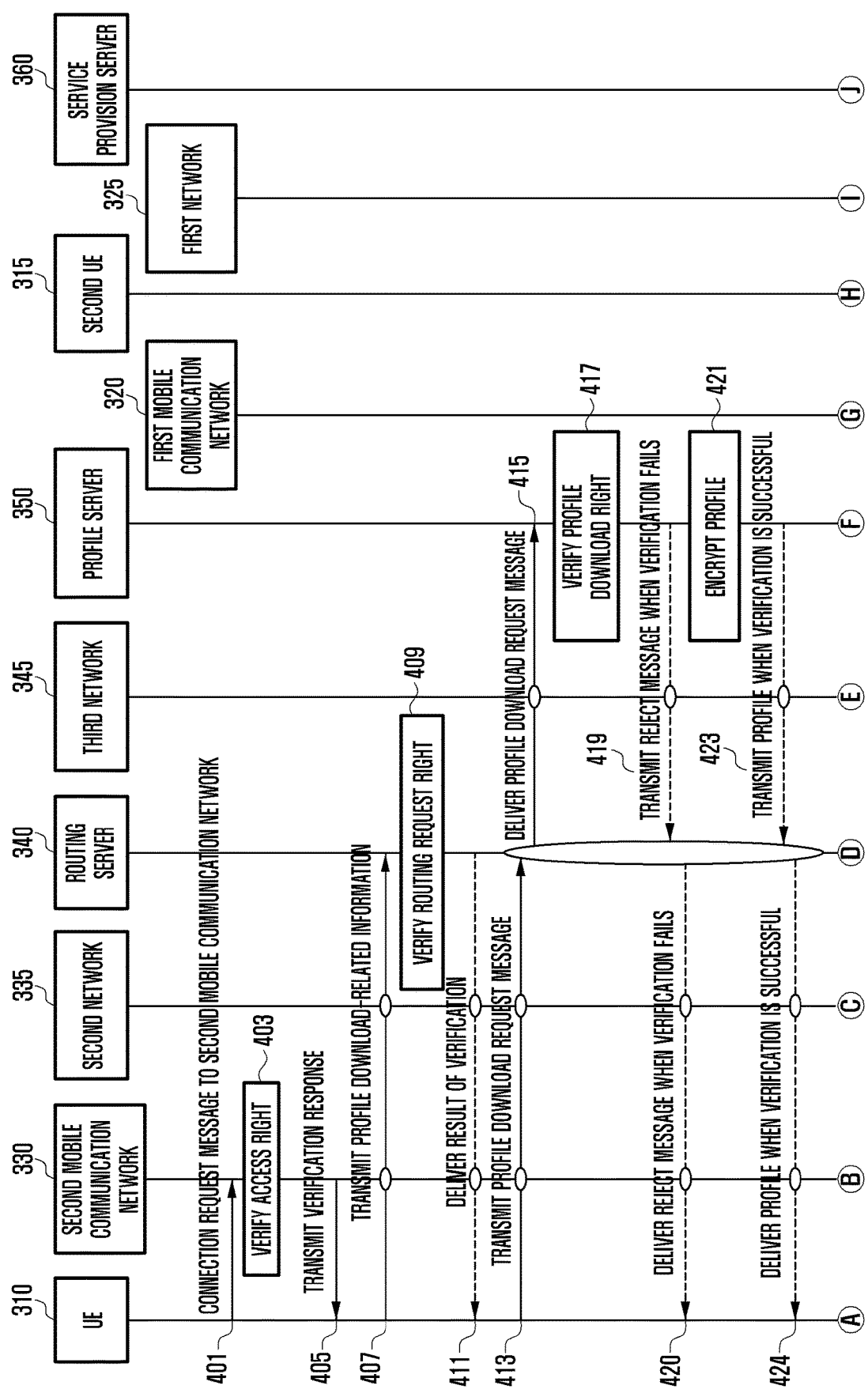
FIG. 4A is a diagram showing a flow of a communication service provided by a mobile communication system according to an embodiment of the present disclosure.
Figure 4B:
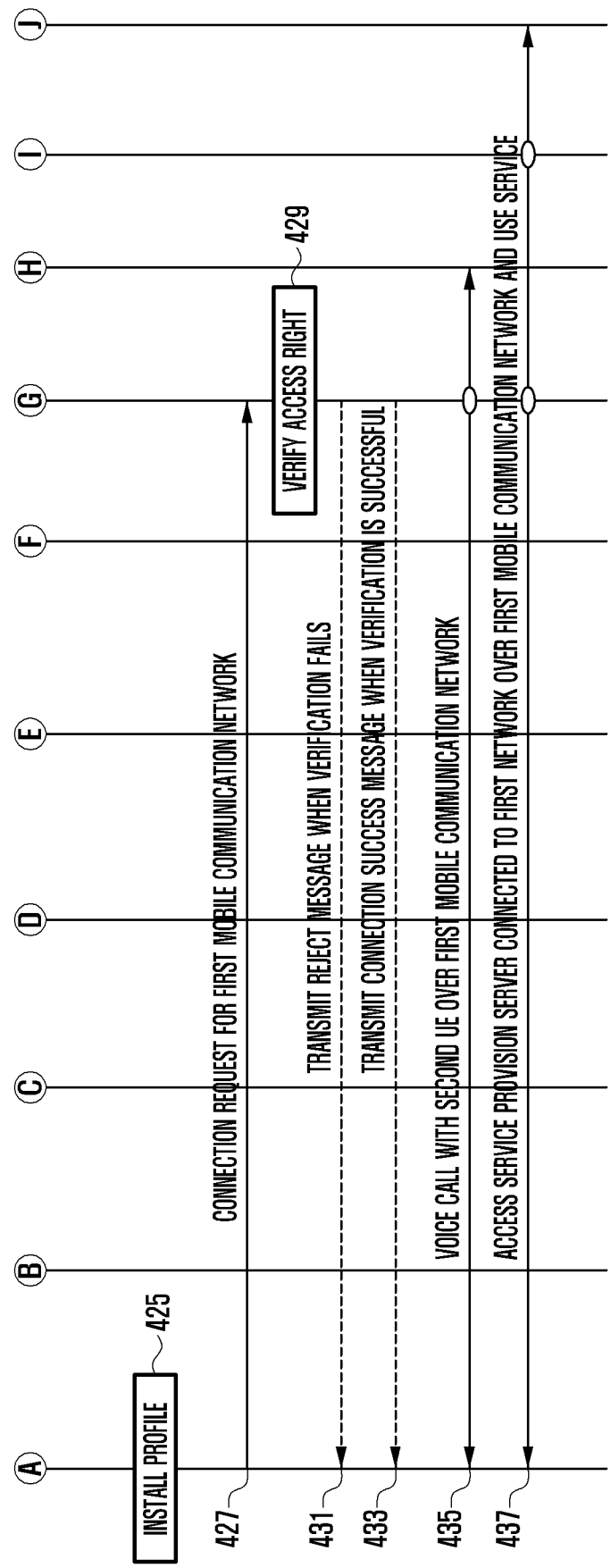
FIG. 4B is a diagram showing a flow of a communication service provided by a mobile communication system according to an embodiment of the present disclosure.

FIG. 4A and FIG. 4B are diagrams showing a flow of a communication service provided by a mobile communication system according to an embodiment of the present disclosure.

Referring to FIGS. 4A and 4B, the mobile communication system may include at least one of the UE 310, the first mobile communication network 320, the first network 325, the second mobile communication network 330, the second network 335, the routing server 340, the profile server 350, the service provision server 360, the third network 345, and the second UE 315. The profile server may be plural.

At operation 401, the UE 310 sends a connection request message to the second mobile communication network 330. The connection request message may include a first credential. The first credential may be identification information for accessing the second mobile communication network 330. The first credential may have been stored in the UE 310. For example, the first credential is information stored in the UICC or eSE of the UE 310 and may be information, such as an IMSI, K or Ki, or may be a value dynamically calculated from the information. At operation 403, the second mobile communication network 330 may verify whether the UE 310 has a right to access the second mobile communication network 330. For example, the second mobile communication network may verify a first Credential. The second mobile communication network 330 may verify whether the UE 310 has a right to access the second mobile communication network 330 by verifying the first credential.

At operation 405, the second mobile communication network 330 may transmit a verification response message to the UE 310. If the second mobile communication network 330 fails in the verification of the first Credential received from the UE (if it is determined that the UE does not have an access right to the second mobile communication network), it may reject the connection request of the UE 330.

If the second mobile communication network 330 succeeds in the verification (if it is determined that the UE has an access right to the second mobile communication network) at operation 405, it may permit access to the second mobile communication network 330. In this case, the operation of the UE 310 that has accessed the second mobile communication network 330 may be limited to some Internet access including access to the routing server 340 depending on the configuration of the second mobile communication network 330. For example, the access of the UE 310 to the second mobile communication network 330 may be limited to an operation for profile reception through a domain name server (DNS) and the routing server 340.

When the UE 310 is successful in the access to the second mobile communication network 330, it accesses the second network 335 over the second mobile communication network 330 and accesses the routing server 340. The second network 335 is a network that connects the second mobile communication network 330 and the routing server 340, and may be connected by one or a plurality of networks. Furthermore, the second network 335 may be a network over which the first network 325 and the third network 345 are connected or not connected.

At operation 407, the UE 310 may transmit profile download-related information to the routing server 340. The UE 310 may transmit the profile download-related information to the routing server 340 over the second network 330. For example, the profile download-related information may include a profile server identifier. The profile server identifier may include identification information of a profile server, for downloading a profile requested by the UE 310. Furthermore, the profile download-related information may include information capable of determining whether the UE 310 has a routing request right to download the profile from the profile server 350 through the routing server 340. For example, the profile download-related information may include a second Credential. In this case, the second Credential may include a certificate, signature, etc. The profile download-related information may include a profile server identifier. Furthermore, the profile server identifier may be an SRID, DPID or SMID, and the identifier may be mapped to the Internet address of the profile server 350.

At operation 409, the routing server 340 may verify the routing request right of the UE 310. The routing server 340 may verify the routing request right of the UE 310 based on the profile download-related information. The routing server may verify the routing request right by verifying the second Credential. The routing request right may be information indicating whether the UE 310 has a profile download right via the routing server 340.

At operation 411, the routing server 340 may deliver a result of the verification to the UE 310. If the verification fails, the routing server 340 delivers a verification failure indication message (e.g., Reject message) to the UE 310. If the verification is successful, the routing server 340 delivers a verification success indication message (e.g., success message) to the UE 310. The routing server 34 may start a routing session if the verification is successful.

At operation 413, the UE 310 may transmit a profile download request message to the routing server 340. For example, the UE 310 may transmit the profile download request message to the IP address of the routing server 340. In the embodiment of FIG. 4A, the UE 310 transmits the profile download request message to the routing server 340 not the profile server 350. The profile download request message may include data for the profile download. The data for profile download may include profile download identification information. The profile download identification information may include information identifying whether the UE 310 has a profile download right. The profile download identification information may include a third credential. The third Credential may include a certificate, signature, a one-time public key or an EID corresponding to the UE 310. The certificate may be an elliptic curved digital signature algorithm (ECDSA) certificate corresponding to an eUICC. The signature is a personal key corresponding to a public key included in the ECDSA certificate and may be a signed value. The disposable public key may be an ephemeral public key. The certificate, signature, disposable public key and EID may be transferred through the same message or may be transferred through separate messages.

At operation 415, when a routing session stars, the routing server 340 may deliver the profile download request message to the profile server 350. The routing server 340 may deliver the profile download request message to the profile server 350 corresponding to a profile server identifier received from the UE. In this case, the routing server 340 may deliver the profile download request message through the profile server 350 and the third network 345. The routing server 340 may deliver the profile download request message, received from the UE and including profile download identification information (e.g., the third credential), to the profile server 350.

At operation 417, when the profile download request message is received, the profile server 350 may verify whether the UE 310 has a profile download right. The profile server 350 may verify whether the UE has a profile download right using the profile download identification information (e.g., the third credential).

If the verification of the right fails as a result of the verification of the profile download identification information, at operation 419, the profile server 350 may deliver a profile download Reject message to the UE 310 via the routing server 340. At operation 420, the routing server 340 may deliver the profile download Reject message, received from the profile server 350, to the UE 310.

If the verification is successful, at operation 423, the profile server sends the profile to the UE 310 via the routing server 330. The profile server 350 may encrypt a profile including first mobile communication network access right information (e.g., a fourth credential) at operation 421. At operation 423, the profile server 350 may transmit the encrypted profile to the UE 310 via the routing server 330. The profile may refer to a profile package.

At operation 424, the routing server 340 may deliver the profile, received from the profile server 350, to the UE 310.

At operation 425, the UE 310 may install the downloaded profile. The UE 310 may install the profile in a UICC.

At operation 427, the UE 310 sends a connection request message to the first mobile communication network 320. The UE 310 sends the connection request to the first mobile communication network using the fourth Credential of the profile included in the downloaded profile.

At operation 429, the first mobile communication network 320 verifies the first mobile communication network access right of the UE 310. For example, the first mobile communication network 320 may verify the access right of the UE 310 to the first mobile communication network by verifying the fourth Credential.

If the verification fails, at operation 431, the first mobile communication network 320 may transmit a Reject message to the UE 310. If the verification is successful, at operation 433, the first mobile communication network 320 may transmit a connection success message to the UE 310.

If a connection with the first mobile communication network 320 is successful, the UE 310 may perform a voice call with the second UE 315 over the first mobile communication network 320 at operation 435, and may access the first Internet over the first mobile communication network 320, may access the service provision server 360, and may be provided with services at operation 437.

Through the above method, the UE 310 may download the profile for using the first mobile communication network 320 using the routing server 340. In order to download the profile download the profile including fourth Credential information for accessing the first mobile communication network 320, the UE 310 accesses the second mobile communication network 330 using the first Credential that provides limited access to the second mobile communication network 330. The UE may download a profile including the fourth Credential information from the profile server via the routing server 340 that may be accessed through the limited access after accessing the second mobile communication network 330. In this case, the routing server 340 may use the second Credential in order to limit a data routing function for a specific UE request.

Figure 5B:
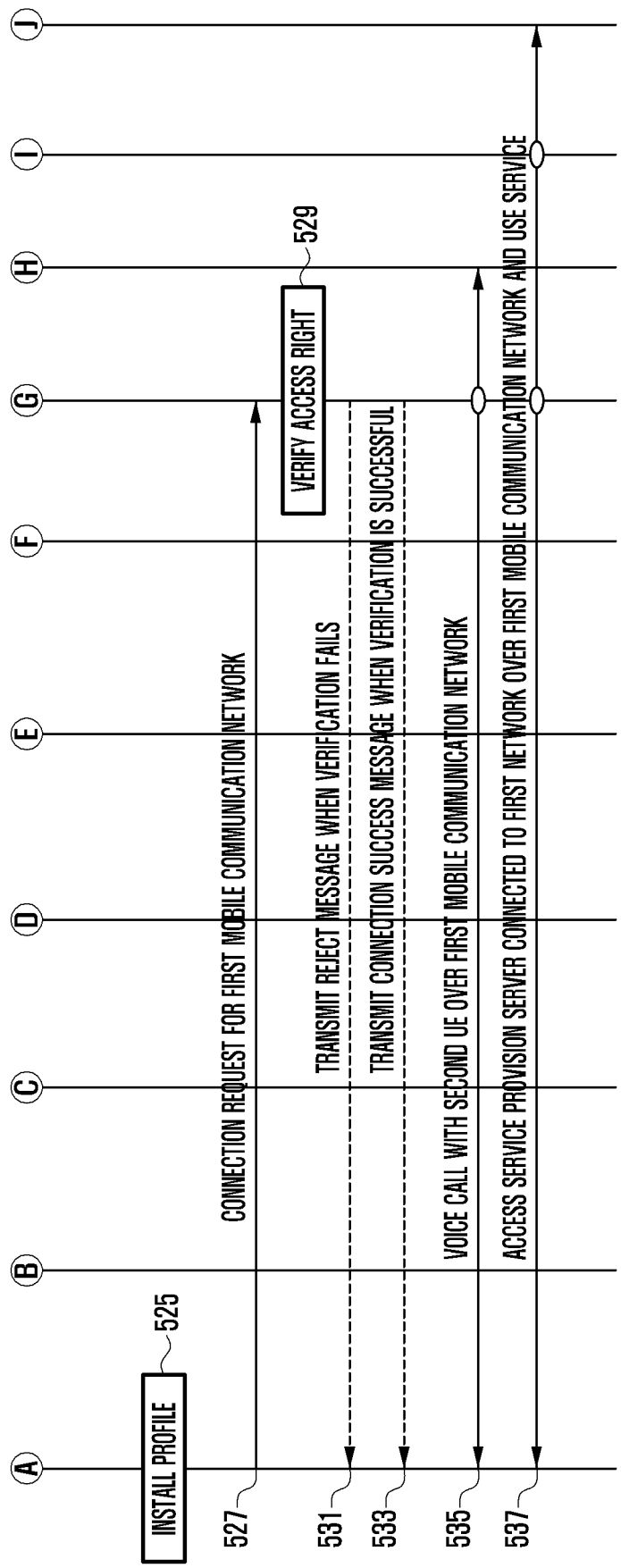
FIG. 5B is a diagram showing a flow of a communication service provided by a mobile communication system according to another embodiment of the present disclosure.

FIG. 5A and FIG. 5B are diagrams showing a flow of a communication service provided by a mobile communication system according to another embodiment of the present disclosure.

Referring to FIGS. 5A and 5B, the mobile communication system may include at least one of the UE 310, the first mobile communication network 320, the first mobile communication network 325, the second mobile communication network 330, the second mobile communication network 335, the routing server 340, the profile server 350, the service provision server 360, the third network 345, and the second UE 315. The profile server may be plural.

At operation 501, the UE 310 sends a connection request message to the second mobile communication network 330. The connection request message may include a first credential. The first credential may be identification information for accessing the second mobile communication network 330.

The first credential may have been stored in the UE 310. The first Credential is information stored in the UICC card within the UE 310 or the eSE within the UE 310 in order to access the second mobile communication network 330, and may be information, such as an IMSI, K or Ki, and a value dynamically calculated from the information.

At operation 503, the second mobile communication network 330 may verify whether the UE 310 has a right to access the second mobile communication network 330. For example, the second mobile communication network may verify the first Credential. The second mobile communication network 330 may verify whether the UE 310 has a right to access the second mobile communication network 330 by verifying the first credential.

At operation 505, the second mobile communication network 330 may transmit a verification response message to the UE 310. If the second mobile communication network 330 fails in the verification of the first Credential received from the UE (if it is determined that the UE does not have an access right to the second mobile communication network), it may reject the connection request of the UE 330 (Reject transfer).

If the second mobile communication network 330 is successful in the verification (if it is determined that the UE has an access right to the second mobile communication network) at operation 505, it may permit access to the second mobile communication network 330 (success transfer). In this case, the operation of the UE 310 that has accessed the second mobile communication network 330 may be limited to some Internet access including access to the routing server 340 depending on the configuration of the second mobile communication network 330. For example, the access of the UE 310 to the second mobile communication network 330 may be limited to an operation for profile reception through the routing server 340.

When the UE 310 is successful in access to the second mobile communication network 330, at operation 506, the UE accesses the second network 335 over the second mobile communication network 330 and accesses the routing server 340. The second network 335 is a network that connects the second mobile communication network 330 and the routing server 340 and may be connected over one network or a plurality of networks. Furthermore, the second network 335 may be a network connected to or not connected to the first network 325 and the third network 345.

The UE 310 may transfer discount coupon information when it is connected to the routing server 340. The discount coupon information may be included in a web URL address and transferred.

At operation 506, an operation corresponding to 407 to 411 of FIG. 4A may be performed.

At operation 507, the routing server 340 may provide the UE 310 with information for available mobile communication service selection. For example, the information for mobile communication service selection may include billing information or list information of mobile communication fees and service information corresponding to fee information. The list may be provided in the form of a web page.

At operation 509, the UE 310 may select an available service based on the information for mobile communication service selection received from the routing server 340, and may transmit a result of the selection to the routing server 340. For example, if the information for mobile communication service selection is a mobile communication fee list, the mobile communication fee list may be displayed on a screen of the UE 310. A user may select a specific rate system or a specific service corresponding to a rate system from the mobile communication fee list displayed in the UE 310. If the user does not directly select a rate system or a service corresponding to a rate system, a default rate system may be selected. If the rate system or service has been selected, payment for an additional service may be performed. Thereafter, at least one piece of information of a result of the selection and a result of the payment may be transferred to the routing server 340.

Meanwhile, at operation 509, the information transmitted from the UE 310 to the routing server 340 may be profile download-related information. For example, the information may be information related to a profile that needs to be downloaded to the UE 310 or information related to a profile server identifier. For example, when a user selects a specific service or a specific rate system, profile server identifier information or profile server identifier-related information corresponding to the corresponding rate system or service may be provided. The profile server identifier-related information may be information for the routing server 340 to determine the profile server identifier. For example, the rate system or service selected by the user may correspond to the profile server identifier.

At operation 511, the routing server 340 may provide the UE 310 with profile download information. The profile download information is information to be used for the UE 310 to download a profile via the routing server 340, and may include at least one of activation code and profile server identifier information. The activation code may be information mapped to the profile.

The activation code and/or the profile server identifier may be mapped to the rate system selected by the UE 310, may be mapped to a communication company corresponding to the rate system, may have been mapped to the profile, or may be mapped to a predetermined profile identifier. The routing server 340 may set the activation code and/or the profile server identifier and start a routing session.

At operation 513, the UE 31 may transmit a profile download request message to the routing server 340. For example, the UE 310 may transmit the profile download request message to the IP address of the routing server 340. In the embodiment of FIG. 5A, the UE 310 transmits the profile download request message to the routing server 340 not the profile server 350. The routing server 340 downloads the profile of the UE 310 from the profile server 350 instead of the UE 310, and may transfer the profile to the UE 310. The profile download request message may include data for the profile download. The profile download request message may include profile download identification information. The profile download identification information may include information identifying whether the UE 310 has a profile download right through the routing server 340. The profile download identification information may include a third credential. The third Credential may include a certificate, signature or a one-time public key corresponding to the UE 310. The UE may additionally transfer activation code.

At operation 515, the routing server 340 may transfer the profile download request message to the profile server 350. The routing server 340 may transfer the profile download request message to the profile server 350 corresponding to a profile server identifier received from the UE. In this case, the routing server 340 may transfer the profile download request message through the profile server 350 and the second network 345. The routing server 340 may transfer the profile download request message, including profile download identification information (e.g., the third credential), to the profile server 350.

At operation 517, when the profile server 350 receives the profile download request message, it may verify whether the UE 310 has a profile download right. The profile server 350 may verify whether the UE has a profile download right using profile download identification information (e.g., the third credential and/or activation code). When the profile server 350 receives data including the third Credential, it may verify the third Credential and the activation code.

If the verification of the right fails, at operation 519, the profile server 350 may transfer a profile download Reject message to the UE 310 via the routing server 340. At operation 520, the routing server 340 may transfer the profile download Reject message, received from the profile server 350, to the UE 310.

If the verification is successful, at operation 523, the profile server sends the profile to the UE 310 via the routing server 330. The profile may correspond to the activation code. At operation 521, the profile server 350 may encrypt a profile including first mobile communication network access right information (e.g., a fourth credential). At operation 523, the profile server 350 may transmit the encrypted profile to the UE 310 via the routing server 330.

At operation 524, the routing server 340 may transfer the profile, received from the profile server 350, to the UE 310.

At operation 525, the UE 310 may install the downloaded profile. The UE 310 may install the profile in the UICC.

At operation 527, the UE 310 sends a connection request message for the first mobile communication network 320. The UE 310 sends the connection request to the first mobile communication network using the fourth Credential of a profile included in the downloaded profile.

At operation 529, the first mobile communication network 320 verifies the first mobile communication network access right of the UE 310. For example, the first mobile communication network 320 may verify the access right to the first mobile communication network of the UE 310 by verifying the fourth Credential.

If the verification fails, at operation 531, the first mobile communication network 320 may transmit a Reject message to the UE 310. If the verification is successful, at operation 533, the first mobile communication network 320 may transmit a connection success message to the UE 310.

When a connection with the first mobile communication network 320 is successful, at operation 533, the UE 310 may perform a voice call with the second UE 315 over the first mobile communication network 320. At operation 535, the UE may access the first Internet over the first mobile communication network 320, may access the service provision server 360, and may be provided with services.

The UE 310 accesses the second mobile communication network 330 using the first Credential that provides limited access to the second mobile communication network 330 in order to download the profile including fourth Credential information for accessing the first mobile communication network 320. After the UE accesses the second mobile communication network 330, it may download the profile including the fourth Credential information from the profile server via the routing server 340 capable of being accessed through the limited access. In this case, the routing server 340 may provide a list of rate systems that may be downloaded by the UE 310, and may provide the UE with activation code mapped to the profile corresponding to the rate system. In this case, the activation code may have been previously set in the profile server 350 or the activation code may be set after a customer may select a rate system. In the latter case, the routing server 340 may transfer information to which the activation code and the profile information to be downloaded may be mapped to the profile server after the customer selects the rate system.

In FIGS. 3, 4A, 4B, 5A, and 5B, a process for the UE to download a profile using the second mobile communication network has been described. However, in an embodiment of the present disclosure, although a network is accessed using another method, such as WiFi, other than the second mobile communication network, the second network may be directly connected and a profile may be downloaded from the profile server via the routing server.

Figure 6:
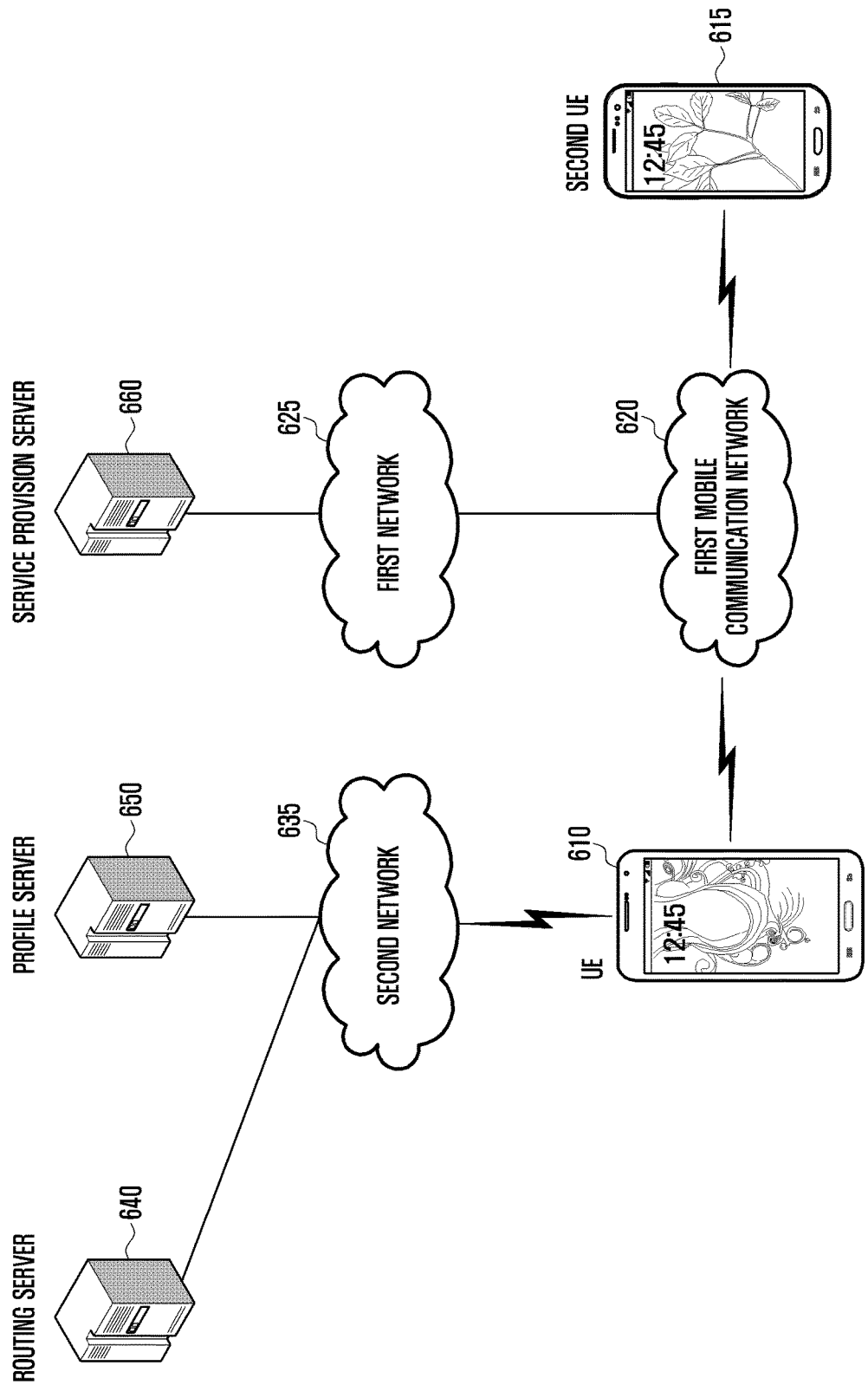
FIG. 6 is a diagram showing another configuration of a mobile communication system for providing a mobile communication service of the present disclosure.

FIG. 6 is a diagram showing the configuration of a mobile communication system if the second mobile communication network is not accessed as described above.

Referring to FIG. 6, the mobile communication system may include at least one of a UE 610, a first mobile communication network 620, a first network 625, a second network 635, a routing server 640, a profile server 650, a service provision server 660, and a second UE 615.

A method using the mobile communication network of an embodiment of FIG. 6 is a method using the mobile communication network, including the UE 610 capable of accessing the routing server over the second network, the second network 635 accessible to the routing server 640, the profile server 650 that the routing server 640 may access over the second network 635, for determining whether or not to provide a profile including a second Credential using the first Credential of the UE 610, the first mobile communication network 620 determining whether or not to permit access to the mobile communication network using the second Credential, the first network 625 that may be additionally accessed when access to the first mobile communication network is possible, the service provision server 660 that may be accessed over the first network 625 capable of being accessed over the first mobile communication network, and the second UE 615 capable of communication over the first mobile communication network.

FIG. 7 is a diagram showing a flow of a communication service provided by the mobile communication system according to the embodiment of FIG. 6 of the present disclosure. In the embodiment of FIG. 7, the UE 610 may download a profile from the profile server via the routing server 640 only when a connected network is the second mobile communication network 630. That is, if a connection is not performed over the second mobile communication network 640, the profile may be directly downloaded without the intervention of the routing server 640. If the second mobile communication network 610 is used, the operation of the embodiment of FIGS. 4A and 4B and/or FIGS. 5A and 5B may be applied.

At operation 706, the UE 610 accesses the second network 635 and connects to the routing server 640. The UE 610 may transfer coupon information when it is connected to the routing server 640. The coupon information may be transferred in the form of a web URL address.

At operation 707, the routing server 640 may provide the UE 610 with information for available mobile communication service selection. For example, the information for mobile communication service selection may include billing information or list information of mobile communication fees and service information corresponding to fee information. The list may be provided in the form of a web page.

At operation 709, the UE 610 may select an available service based on the information for mobile communication service selection received from the routing server 640, and may transmit the results of the selection to the routing server 640. For example, if the information for mobile communication service selection is a mobile communication fee list, the mobile communication fee list may be displayed on a screen of the UE 610. A user may select a specific rate system or a specific service corresponding to a rate system from the mobile communication fee list displayed in the UE 610. If the user does not directly select a rate system or a service corresponding to a rate system, a default rate system may be selected. If the rate system or service has been selected, payment for an additional service may be performed. Thereafter, at least one piece of information of a result of the selection and a result of the payment may be transferred to the routing server 640.

Meanwhile, at operation 509, the information transmitted from the UE 610 to the routing server 640 may be profile download-related information. For example, the information may be information related to the profile that needs to be downloaded onto the UE 610 or information related to a profile server identifier. For example, when a user selects a specific service or a specific rate system, profile server identifier information or profile server identifier-related information corresponding to the corresponding rate system or service may be provided. The profile server identifier-related information may be information for the routing server 640 to determine a profile server identifier.

At operation 711, the routing server 640 may provide the UE 610 with profile download information. The profile download information is information used for the UE 610 to download the profile via the routing server 640, and may include at least one of activation code and profile server identifier information. The activation code may be information mapped to the profile.

The activation code and/or the profile server identifier may be mapped to the rate system selected by the UE 610, may be mapped to a communication company corresponding to the rate system, may have been mapped to the profile, or may be mapped to a predetermined profile identifier.

At operation 713, the UE 610 may transmit a profile download request message to the profile server 650. For example, the UE 310 may transmit the profile download request message to the IP address of the profile server 650. In the embodiment of FIG. 7, the UE 610 transmits the profile download request message to the profile server 650 not the routing server 640. The profile download request message may include data for the profile download. The profile download request message may include profile download identification information. The profile download identification information may include information identifying whether the UE 610 has a right to download the profile from the profile server 340. The profile download identification information may include a first credential. The first Credential may include a certificate, signature or a one-time public key corresponding to the UE 610. The UE may additionally transfer activation code.

At operation 717, when the profile server 650 receives the profile download request message, it may verify whether the UE 610 has a profile download right. The profile server 650 may verify whether the UE has the profile download right using the profile download identification information (e.g., the first credential and/or activation code). When data including the first Credential is received, the profile server 650 may verify the first Credential and the activation code.

If the verification of the right fails, at operation 719, the profile server 650 may transfer a profile download Reject message to the UE 610.

If the verification is successful, at operation 723, the profile server 650 transmits the profile to the UE 610. The profile may correspond to the activation code. At operation 721, the profile server 650 may encrypt the profile including first mobile communication network access right information (e.g., a second credential). At operation 723, the profile server 750 may transmit the encrypted profile to the UE 610.

At operation 725, the UE 610 may install the downloaded profile. The UE 610 may install the profile in the UICC.

At operation 727, the UE 610 sends a connection request message to the first mobile communication network 620. The UE 610 sends the connection request to the first mobile communication network using the second Credential of the profile included in the downloaded profile.

At operation 729, the first mobile communication network 620 verifies the access right of the UE 610 to the first mobile communication network. For example, the first mobile communication network 620 may verify the access right of the UE 610 to the first mobile communication network using the second Credential.

If the verification fails, at operation 731, the first mobile communication network 620 may transmit a Reject message to the UE 610.

If the verification is successful, at operation 733, the first mobile communication network 620 may transmit a connection success message to the UE 610. If a connection with the first mobile communication network 620 is successful, the UE 610 may perform a voice call with the second UE 615 over the first mobile communication network 620 at operation 735, and may access the first Internet over the first mobile communication network 620, may access the service provision server 660, and may be provided with services at operation 737.

Figure 8A:
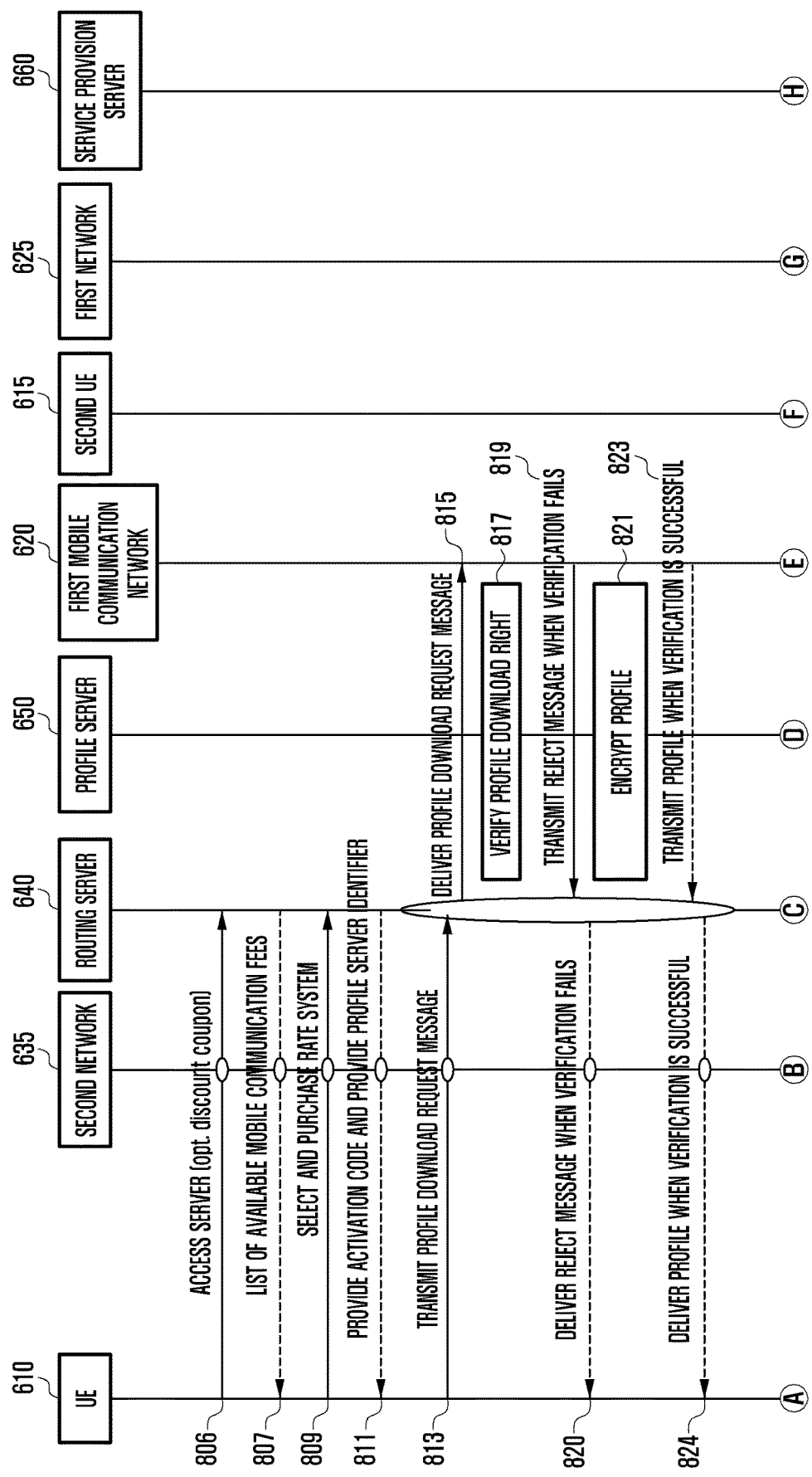
FIG. 8A is a diagram showing a flow of a communication service provided by the mobile communication system according to the embodiment of FIG. 6 of the present disclosure.
Figure 8B:
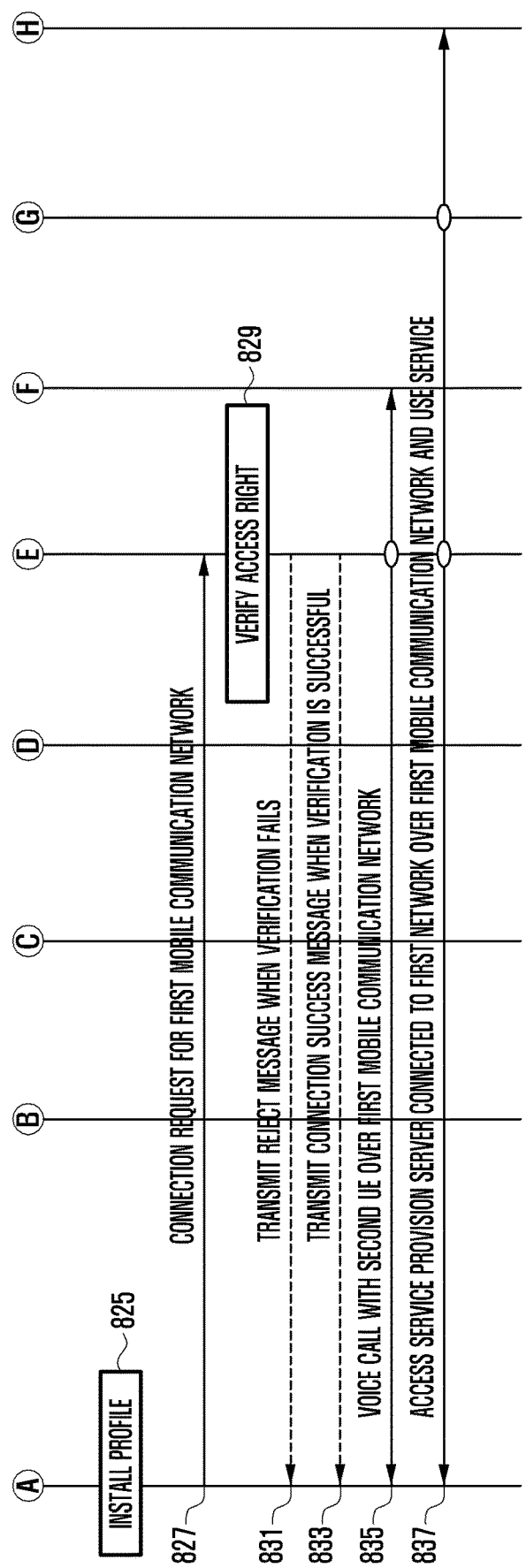
FIG. 8B is a diagram showing a flow of a communication service provided by the mobile communication system according to the embodiment of FIG. 6 of the present disclosure.

FIG. 8A and FIG. 8B are diagrams showing a flow of a communication service provided by the mobile communication system according to an embodiment of FIG. 6 of the present disclosure. In the embodiment of FIGS. 8A and 8B, a profile may be downloaded from the profile server via the routing server regardless of the type of network to which the UE is connected.

At operation 806, the UE 610 is connected to the routing server 640 by accessing the second network 635. When the UE 610 is connected to the routing server 640, it may transfer coupon information. The coupon information may be transferred in the form of a web URL address.

At operation 807, the routing server 640 may provide the UE 610 with information for available mobile communication service selection. For example, information for mobile communication service selection may include billing information or list information of mobile communication fees and service information corresponding to fee information. The list may be provided in the form of a web page.

At operation 809, the UE 610 may select an available service based on the information for mobile communication service selection received from the routing server 640, and may transmit a result of the selection to the routing server 640. For example, if the information for mobile communication service selection is a mobile communication fee list, the mobile communication fee list may be displayed on a screen of the UE 610. A user may select a specific rate system or a specific service corresponding to a rate system from the mobile communication fee list displayed in the UE 610. If the user does not directly select a rate system or a service corresponding to a rate system, a default rate system may be selected. If the rate system or service has been selected, payment for an additional service may be performed. Thereafter, at least one piece of information of a result of the selection and a result of the payment may be transferred to the routing server 640.

Meanwhile, at operation 809, the information transmitted from the UE 610 to the routing server 640 may be profile download-related information. For example, the information may be information related to a profile that needs to be downloaded onto the UE 610 or information related to a profile server identifier. For example, if a user selects a specific service or a specific rate system, profile server identifier information or profile server identifier-related information corresponding to the corresponding rate system or service may be provided. The profile server identifier-related information may be information for the routing server 640 to determine the profile server identifier.

At operation 811, the routing server 640 may provide profile download information to the UE 610. The profile download information is information that is used for the UE 610 to download a profile via the routing server 640, and may include at least one of activation code and profile server identifier information. The activation code may be information mapped to the profile.

The activation code and/or the profile server identifier may be mapped to the rate system selected by the UE 610, may be mapped to a communication company corresponding to the rate system, may have been mapped to the profile, or may be mapped to a predetermined profile identifier.

At operation 813, the UE 610 may transmit a profile download request message to the routing server 640. For example, the UE 610 may transmit the profile download request message to the IP address of the routing server 640. In the embodiment of FIG. 8A, the UE 610 transmits the profile download request message to the routing server 640 not the profile server 650. The routing server 640 may download the profile of the UE 610 from the profile server 650 instead of the UE 610, and may transfer the profile to the UE 610. The profile download request message may include data for the profile download. The profile download request message may include profile download identification information. The profile download identification information may include information identifying whether the UE 610 has a profile download right through the routing server 640. The profile download identification information may include a first credential. The first Credential may include a certificate, signature or a one-time public key corresponding to the UE 610. The UE 610 may additionally transfer the activation code.

At operation 815, the routing server 640 may transfer the profile download request message to the profile server 650. The routing server 640 may transfer the profile download request message to the profile server 650 corresponding to the profile server identifier received from the UE 610. In this case, the routing server 640 may transfer the profile download request message through the profile server 650 and the second network 625. The routing server 640 may transfer the profile download request message, including the profile download identification information (e.g., the first credential), to the profile server 650.

At operation 817, when the profile server 650 receives the profile download request message, it may verify whether the UE 610 has a profile download right. The profile server 650 may verify whether the UE has the profile download right using the profile download identification information (e.g., the first credential and/or the activation code). When the profile server 650 receives data including the first Credential, it may verify the first Credential and the activation code.

If the verification of the right fails, at operation 819, the profile server 650 may transfer a profile download Reject message to the UE 610 via the routing server 640. At operation 820, the routing server 640 may transfer the profile download Reject message, received from the profile server 650, to the UE 610.

If the verification is successful, at operation 823, the profile server transmits the profile to the UE 610 via the routing server 630. The profile may correspond to the activation code. At operation 821, the profile server 650 may encrypt the profile including first mobile communication network access right information (e.g., a second credential). At operation 823, the profile server 650 may transmit the encrypted profile to the UE 610 via the routing server 630.

At operation 824, the routing server 640 may transfer the profile, received from the profile server 650, to the UE 610.

At operation 825, the UE 610 may install the downloaded profile. The UE 610 may install the profile in the UICC.

At operation 827, the UE 610 sends a connection request message to the first mobile communication network 620. The UE 610 transmits the connection request to the first mobile communication network using the second Credential of a profile included in the downloaded profile.

At operation 829, the first mobile communication network 620 verifies the access right of the UE 610 to the first mobile communication network. For example, the first mobile communication network 620 may verify the access right of the UE 610 to the first mobile communication network using the second Credential.

If the verification fails, at operation 831, the first mobile communication network 620 may transmit a Reject message to the UE 610.

If the verification is successful, at operation 833, the first mobile communication network 620 may transmit a connection success message to the UE 610. If a connection with the first mobile communication network 620 is successful, at operation 835, the UE 610 may perform a voice call with the second UE 615 over the first mobile communication network 620. At operation 837, the UE 610 may access the first Internet over the first mobile communication network 620, may access the service provision server 660, and may be provided with services.

Figure 9:
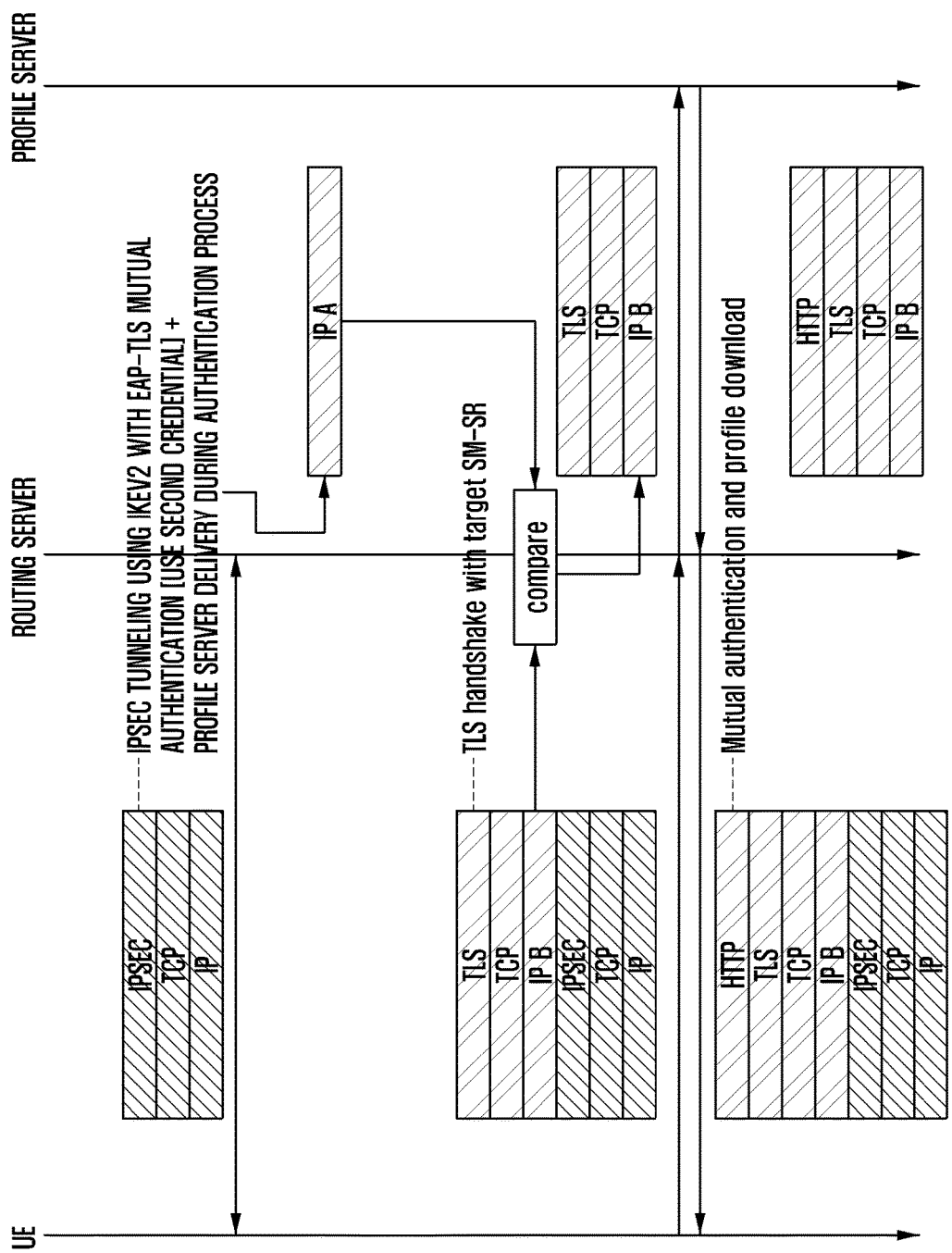
FIG. 9 is a diagram showing a flow of a communication service provided by the mobile communication system according to an additional embodiment of the present invention.

FIG. 9 is a diagram showing a flow of a communication service provided by the mobile communication system according to an additional embodiment of the present invention.

FIG. 9 is an embodiment in which a profile identifier is subjected to EAP-TLS authentication using IKEv2 and transferred. In this case, the EAP-TLS authentication may be performed using the second Credential of FIGS. 4A and 4B. During the EAP-TLS authentication process, the profile identifier may be transferred in an EAP packet or IKEv2 packet. In this case, the routing server may store the IP (IP A) of the profile server using the profile identifier. Thereafter, when the packet of the UE transferred through a connected IPSEC tunnel is directed toward an IP B, the routing server may transfer the IP packet of the UE, stored as IPSEC, to the profile server only when the stored IP A and the IP B are the same.

Figure 10:
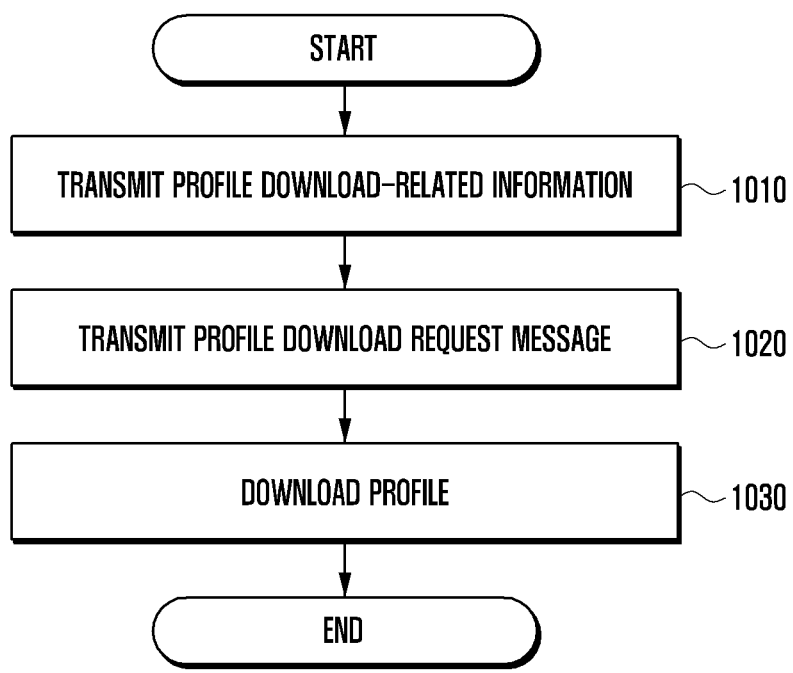
FIG. 10 is a diagram illustrating an operation of a UE according to an embodiment of the present invention.

FIG. 10 is a diagram illustrating an operation of a UE according to an embodiment of the present invention.

Referring to FIG. 10 at operation, 1010, the UE may transmit profile download-related information to the routing server. The UE may transmit the profile download-related information to the routing server using a mobile communication network that permits limited access for profile download. Furthermore, the UE may be directly connected to a network connected to the routing server using WiFi.

The profile download-related information may include a profile server identifier. The profile server identifier may include identification information for the profile server for download of a profile requested by the UE. Furthermore, the profile download-related information may include information (e.g., first identification information) indicating whether the UE has a download request right to the profile from the profile server through the routing server. The UE may transfer the profile server identifier using the first identification information. In this case, the first identification information may include a certificate and signature. Furthermore, the profile server identifier may be an SRID, DPID or SMID, and the identifier may be mapped to the Internet address of the profile server 350.

The UE may receive information indicating whether a profile download right via the routing server is present.

At operation 1020, the UE may transmit a profile download request message to the routing server. For example, the UE may transmit the profile download request message to the IP address of the routing server. The UE transmits the profile download request message to the routing server not the profile server. The routing server may download the profile of the UE from the profile server instead of the UE, and may transfer the profile to the UE. The profile download request message may include data for the profile download. The profile download request message may include the profile download identification information. The profile download identification information may include information identifying whether the UE has a profile download right through the routing server.

The profile download identification information may include second identification information. The second identification information may include a certificate, signature or a one-time public key corresponding to the UE.

Meanwhile, the routing server may transfer the profile download request message to the profile server. The routing server may transfer the profile download request message to a profile server corresponding to the profile server identifier received from the UE. In this case, the routing server may transfer the profile download request message through the profile server and the second network. The routing server may transfer the profile download request message, including the profile download identification information (e.g., the second identification information), to the profile server.

At operation 1030, the UE may download the profile. The UE may download the profile from the routing server. The routing server downloads the profile of the UE from the profile server and transfers the downloaded profile to the UE.

The profile server may verify whether the UE has a profile download right based on the second identification information received from the UE. The profile may include information about an access right to a mobile communication network to be used by the UE.

The UE may install the downloaded profile, may access the mobile communication network, and may use a mobile communication service.

Operation 1010 may be extended to include the following contents. The UE may be provided with information for mobile communication service selection from the routing server, may select a mobile communication service, and may transmit information about the selected mobile communication service.

Specifically, the UE may receive information for available mobile communication service selection from the routing server. For example, the information for mobile communication service selection may include billing information or list information of mobile communication fees and service information corresponding to fee information. The list may be provided in the form of a web page.

The UE may select an available service based on the information for mobile communication service selection received from the routing server, and may transmit a result of the selection to the routing server. For example, if the information for mobile communication service selection is a mobile communication fee list, the mobile communication fee list may be displayed on a screen of the UE. A user may select a specific rate system or a specific service corresponding to a rate system from the mobile communication fee list displayed in the UE. If the user does not directly select a specific rate system or a specific service, a default rate system may be selected. If the rate system or service has been selected, payment for an additional service may be performed. Thereafter, at least one piece of a result of the selection and a result of the payment may be transferred to the routing server.

The profile download-related information may include information related to a profile that needs to be downloaded and information related to a profile server identifier. For example, if a user selects a specific service or a specific rate system, profile server identifier information or profile server identifier-related information corresponding to the corresponding rate system or service may be provided. The profile server identifier-related information may be information for the routing server to determine a profile server identifier.

Through the above method, the UE may download the profile via the routing server.

Figure 11:
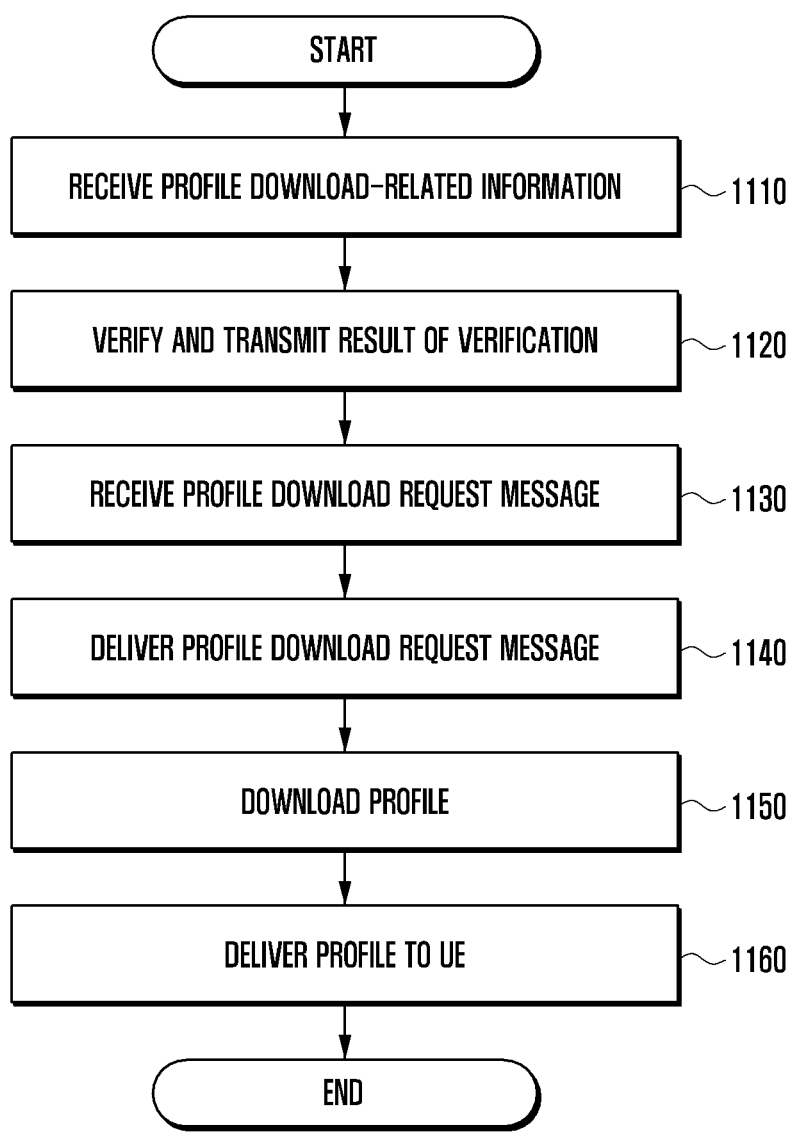
FIG. 11 is a diagram illustrating an operation of a routing server according to an embodiment of the present invention.

FIG. 11 is a diagram illustrating an operation of the routing server according to an embodiment of the present invention.

Referring to FIG. 11, at operation 1100, the routing server may receive profile download-related information from the UE. In an embodiment of the present disclosure, the routing server may download a profile for the UE when the UE is directly connected to a network connected to the routing server using WiFi in addition to a case where the UE is connected to the routing server using a mobile communication network that permits limited access for profile download, and may provide the downloaded profile to the UE.

The profile download-related information may include a profile server identifier. The profile server identifier may include identification information about the profile server from which the profile requested by the UE is downloaded. Furthermore, the profile download-related information may include information (e.g., first identification information) indicating whether the UE has a request right to download the profile from the profile server through the routing server.

At operation 1120, the routing server may verify the profile download right of the UE. The routing server may verify the download request right of the UE based on the profile download-related information. The routing server may verify the download request right by verifying the first identification information. The download request right may be information indicating whether the UE 310 has the profile download right via the routing server 340. The routing server may transmit a result of the verification to the UE.

At operation 1130, the routing server may receive a profile download request message from the UE. In this case, the UE may transmit the profile download request message to the IP address of the routing server. The UE transmits the profile download request message to the routing server not the profile server. The routing server may download the profile of the UE from the profile server instead of the UE, and may transfer the profile to the UE. The profile download request message may include data for the profile download. The profile download request message may include profile download identification information. The profile download identification information may include information identifying whether the UE has a profile download right through the routing server. The profile download identification information may include second identification information. The second identification information may include a certificate, signature or a one-time public key corresponding to the UE.

At operation 1140, the routing server may transfer the profile download request message to the profile server. The routing server may transfer the profile download request message to a profile server corresponding to the profile server identifier received from the UE. In this case, the routing server may transfer the profile download request message through the profile server and a network. The routing server may transfer the profile download request message, including the profile download identification information (e.g., second identification information), to the profile server.

When the profile server receives the profile download request message, it may verify whether the UE has a profile download right. The profile server may verify whether the UE has the profile download right using the profile download identification information. The routing server may receive a result of the verification from the profile server, and may transfer a result of the verification to the UE.

At operation 1150, the routing server may receive the profile of the UE from the profile server. The profile may include information about an access right to a mobile communication network to be used by the UE.

At operation 1160, the routing server may transfer the received profile to the UE.

Meanwhile, operation 1110 may be expended as follows.

The routing server may provide the UE with information for mobile communication service selection, and may receive information about a mobile communication service selected by the UE from the UE.

Specifically, the routing server may provide the UE with information for available mobile communication service selection. For example, the information for mobile communication service selection may include billing information or list information of mobile communication fees and service information corresponding to fee information. The list may be provided in the form of a web page.

The UE may select an available service based on the information for mobile communication service selection received from the routing server, and may transmit a result of the selection to the routing server. For example, if the information for mobile communication service selection is a mobile communication fee list, the mobile communication fee list may be displayed on a screen of the UE. A user may select a specific rate system or a specific service corresponding to a rate system from the mobile communication fee list displayed in the UE. If the user does not directly select a specific rate system or a specific service, a default rate system may be selected. If the rate system or service has been selected, payment for an additional service may be performed. Thereafter, at least one piece of a result of the selection and a result of the payment may be transferred to the routing server.

The profile download-related information may include information related to the profile that needs to be downloaded and information related to the profile server identifier. For example, if the user selects a specific service or a specific rate system, profile server identifier information or profile server identifier-related information corresponding to the corresponding rate system or service may be provided. The profile server identifier-related information may be information for the routing server to determine the profile server identifier.

Figure 12:
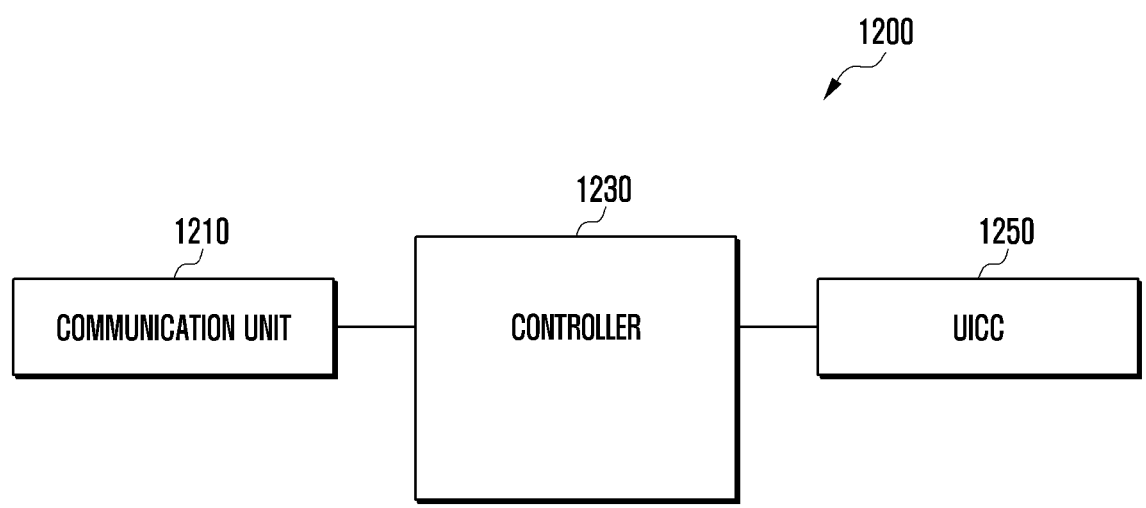
FIG. 12 is a diagram showing the configuration of a UE according to an embodiment of the present invention.

FIG. 12 is a diagram showing the configuration of a UE according to an embodiment of the present invention.

In an embodiment of the present disclosure, an electronic device may be a device including a UICC capable of profile download and installation. The electronic device may be a UE.

Referring to FIG. 12, the electronic device 1200 may include a communication unit 1210, a controller 1230 and a UICC 1250. The communication unit 1210 may receive a signal from another node and transmit a signal to another node. The controller 1230 may control an overall operation of the electronic device. The controller 1230 may control the operations of the electronic device (UE), described through FIGS. 1 to 11 of the present disclosure, to be performed. The UICC 1250 may download a profile and install the downloaded profile.

In accordance with an embodiment of the present disclosure, the controller 1230 may perform control so that profile download request-related information including profile server indication information is transmitted to the routing server, a profile download request message including profile download identification information is transmitted to the routing server, and a profile is received from the routing server. The profile download request message may be transferred to the profile server that provides the profile of the electronic device via the routing server based on the profile server indication information.

Furthermore, the controller 1230 may perform control so that information indicating whether there is a profile download right through the routing server is transmitted to the routing server and a result of the verification of the profile download right through the routing server is received from the routing server.

Furthermore, the controller 1230 may control so that an access request message is transmitted to a mobile communication network having a limited access band for profile download and information indicating whether access for profile download is approved or not is received from the mobile communication network. If access to the mobile communication network is approved, the controller may perform control so that profile download request-related information is transmitted to the routing server using the mobile communication network.

Furthermore, the controller 1230 may perform control so that information for mobile communication service selection is received from the routing server and selection information about at least one piece of information for mobile communication service selection is transmitted to the routing server.

Furthermore, the controller may perform control so that at least one of profile server indication information and activation code corresponding to the selection information is received from the routing server.

Operations of the electronic device 1200 and the controller 1230 are not limited to the operations described in FIG. 12, and the controller 1220 may perform the operations of the electronic device (UE) described through FIGS. 1 to 11 of the present disclosure.

Figure 13:
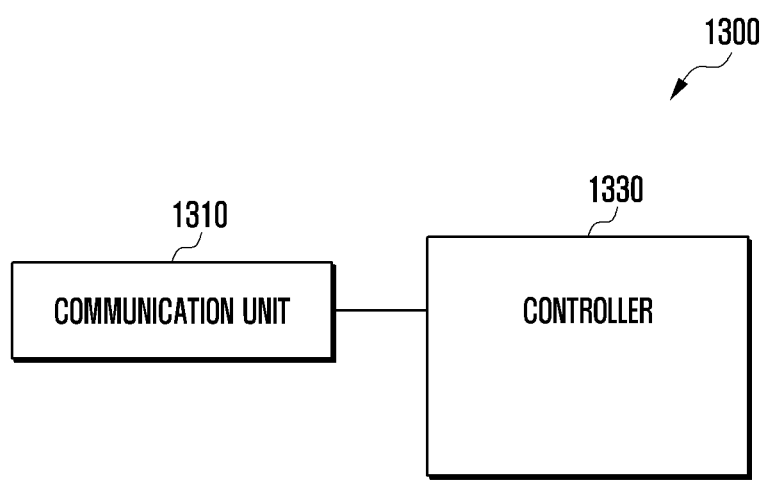
FIG. 13 is a diagram showing the configuration of a routing server according to an embodiment of the present invention.

FIG. 13 is a diagram showing the configuration of a routing server according to an embodiment of the present invention.

Referring to FIG. 13, the routing server 1300 may include a communication unit 1310 and a controller 1330. The communication unit 1310 may receive a signal from another node or transmit a signal to another node. The controller 1330 may control an overall operation of the routing server 1300.

In accordance with an embodiment of the present disclosure, the controller 1330 may perform control so that profile download request-related information including profile server indication information is received from an electronic device, a profile download request message including the profile download identification information is received from the electronic device, a profile download request message is transferred to the profile server based on the profile server indication information, the profile of the electronic device is received from the profile server, and the received profile is transferred to the electronic device.

Furthermore, the controller 1330 may perform control so that information indicating whether the electronic device has a profile download right through the routing server is received from the electronic device and a result of the verification of the profile download right through the routing server is transmitted to the electronic device.

The routing server 1300 may be a predetermined server through which the electronic device may access a mobile communication network having a limited access band for profile download.

Furthermore, the controller 1330 may perform control so that information for mobile communication service selection is transmitted to the electronic device and selection information about at least one service of the information for mobile communication service selection is received from the electronic device.

Furthermore, the controller 1330 may perform control so that at least one of profile server indication information and activation code corresponding to the selection information is transmitted to the electronic device.

Operations of the routing server 1300 and the controller 1330 are not limited to the operation described in FIG. 13. The controller 1330 may perform the operations of the routing server described through FIGS. 1 to 11 of the present disclosure.

The methods according to the embodiments described in the claims or specification of the present disclosure may be implemented in the form of hardware, software or a combination of hardware and software.

If the method is implemented in software, a computer-readable storage medium storing one or more programs (software modules) may be provided. The one or more programs stored in the computer-readable storage medium are configured for execution by one or more processors within the electronic device (e.g., UE or server). The one or more programs include instructions that enable the electronic device to execute the methods according to the embodiments described in the claims or specification of the present disclosure.

Such a program (software module or software) may be stored in non-volatile memory including random access memory and flash memory, read only memory (ROM), electrically erasable programmable read only memory (EEPROM), a magnetic disc storage device, compact disc-ROM (CD-ROM), digital versatile discs (DVDs) or other forms of optical devices or a magnetic cassette. Alternatively, the program may be stored in memory consisting of some or all of them. Furthermore, a plurality of each of the pieces of element memory may be included.

Furthermore, the program may be stored in an attachable storage device capable of accessing a communication network, such as the Internet, Intranet, a local area network (LAN), a wide LAN (WLAN) or a storage area network (SAN) or a communication network consisting of a combination of them. Such a storage device may be connected to a device capable of performing the embodiment of the present disclosure through an external port. Furthermore, a separate storage device over a communication network may be connected to a device that performs the embodiment of the present disclosure.

In the aforementioned detailed embodiments of the present disclosure, the elements included in the invention may be expressed in the singular or plural form depending on the proposed detailed embodiment. However, the singular or plural expression has been selected suitably for a situation proposed for convenience of description, and the present disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Furthermore, the embodiments of the present disclosure may be implemented in the form of computer-readable code in a computer-readable recording medium. The computer-readable recording medium may be a specific data storage device capable of storing data readable by a computer system. Examples of the computer-readable recording medium may include read-only memory (ROM), volatile non-volatile memory, CD-ROM, magnetic tapes, floppy disks, optical data storage devices, and carrier waves (such as data transmission through the Internet). Furthermore, functional programs, code, and code segments for achieving the present disclosure may be easily construed by programmers skilled in the field to which the present disclosure is applied.

It may be aware that the apparatus and method according to the embodiments of the present disclosure may be realized in the form of hardware, software or a combination of hardware and software. Such specific software may be stored in a volatile or non-volatile storage device such as a storage device of ROM, or memory such as RAM, a memory chip, device or an integrated circuit, for example, or a storage medium capable of being written optically or magnetically and also being readable by a machine (e.g., computer), such as a CD, a DVD, a magnetic disk or a magnetic tape, for example, regardless of whether the software can be deleted or rewritten or not, for example. The method according to the embodiments of the present disclosure may be implemented by a network entity, such as a server managed by a communication service provider in a computer, including a controller and memory, various portable terminals or a wireless communication system. It may be aware that the memory is an example of a program, including instructions that implement the embodiments of the present disclosure, or a machine-readable storage medium suitable for storing the programs.

Accordingly, the embodiments of the present disclosure include a program including code for implementing the apparatus or method described in the claims and a storage medium readable by a machine (computer, etc.) for storing such a program.

Meanwhile, although the detailed embodiments of the present disclosure have been described in the detailed description of the present disclosure, the present disclosure may be modified in various ways without departing from the scope of the present disclosure. Accordingly, the scope of the present disclosure should not be limited to the aforementioned embodiments, but should be defined by not only the claims, but equivalents thereof.

The invention claimed is:

1. A method performed by an electronic device, the method comprising:
  transmitting, to a server, first information associated with a routing authorization;
  receiving, from the server, second information for selecting mobile communication service;
  transmitting, to the server, third information associated with a mobile communication service that is selected based on the second information;
  transmitting, to the server, fourth information for downloading a profile;
  receiving, from a profile server through the server, the profile corresponding to the fourth information; and
  installing the profile to an embedded universal integrated circuit card (eUICC) of the electronic device,
  wherein the profile includes at least one of an application, a file system, or an authentication key.

2. The method of claim 1, further comprising:
  receiving, from the server, fifth information including at least one of an activation code or information for identifying the profile server,
  wherein the activation code or the information for identifying the profile server are determined based on the selected mobile communication service.

3. The method of claim 2,
  wherein the fourth information for downloading the profile is delivered to the profile server in case that the fourth information includes at least one of the activation code or the information for identifying the profile server included in the fifth information.

4. The method of claim 1, wherein the second information includes at least one of billing information, list information of mobile communication fees, or list of mobile communication service corresponding to the mobile communication fees.

5. The method of claim 1,
  wherein the profile server is identified based on at least one of the selected mobile communication service or the fourth information,
  wherein the fourth information includes at least one of first identification information or second identification information,
  wherein the first identification information includes at least one of a certificate, a signature, a public key, an activation code or information for the eUICC, and
  wherein the second identification information includes at least one of a subscription manager identifier (SMID), a secure routing identifier (SRID), data preparation identifier (DPID) or an address of the profile server.

6. An electronic device comprising:
  a transceiver;
  a controller configured to:
    transmit, to a server via the transceiver, first information associated with a routing authorization,
    receive, from the server via the transceiver, second information for selecting mobile communication service,
    transmit, to the server via the transceiver, third information associated with a mobile communication service that is selected based on the second information,
    transmit, to the server via the transceiver, fourth information for downloading a profile, and
    receive, from a profile server via the transceiver through the server, the profile corresponding to the fourth information; and an embedded universal integrated circuit card (eUICC) configured to install the profile,
wherein the profile includes at least one of an application, a file system, or an authentication key.

7. The electronic device of claim 6,
wherein the controller is further configured to receive, from the server via the transceiver, fifth information including at least one of an activation code or information for identifying the profile server, and
wherein the activation code or the information for identifying the profile server are determined based on the selected mobile communication service.

8. The electronic device of claim 7,
wherein the fourth information for downloading the profile is delivered to the profile server in case that the fourth information includes at least one of the activation code or the information for identifying the profile server included in the fifth information.

9. The electronic device of claim 6, wherein the second information includes at least one of billing information, list information of mobile communication fees, or list of mobile communication service corresponding to the mobile communication fees.

10. The electronic device of claim 6,
wherein the profile server is identified based on at least one of the selected mobile communication service or the fourth information,
wherein the fourth information includes at least one of first identification information or second identification information,
wherein the first identification information includes at least one of a certificate, a signature, a public key, an activation code or information for the eUICC, and
wherein the second identification information includes at least one of a subscription manager identifier (SMID), a secure routing identifier (SRID), data preparation identifier (DPID) or an address of the profile server.

11. A method performed by a server, the method comprising:
receiving, from an electronic device, first information associated with a routing authorization;
transmitting, to the electronic device, second information for selecting mobile communication service;
receiving, from the electronic device, third information associated with a mobile communication service that is selected based on the second information;
receiving, from the electronic device, fourth information for downloading a profile;
transmitting, to a profile server, information included in the fourth information;
receiving, from the profile server, the profile corresponding to the fourth information; and
transmitting, to the electronic device, the profile including at least one of an application, a file system, or an authentication key,
wherein the profile is installed to an embedded universal integrated circuit card (eUICC) of the electronic device.

12. The method of claim 11, further comprising:
transmitting, to the electronic device, fifth information including at least one of an activation code or information for identifying the profile server,
wherein the activation code or the information for identifying the profile server are determined based on the selected mobile communication service.

13. The method of claim 12,
wherein the fourth information for downloading the profile is delivered to the profile server in case that the fourth information includes at least one of the activation code or the information for identifying the profile server included in the fifth information.

14. The method of claim 11, wherein the second information includes at least one of billing information, list information of mobile communication fees, or list of mobile communication service corresponding to the mobile communication fees.

15. The method of claim 11,
wherein the profile server is identified based on at least one of the selected mobile communication service or the fourth information,
wherein the fourth information includes at least one of first identification information or second identification information,
wherein the first identification information includes at least one of a certificate, a signature, a public key, an activation code or information for the eUICC, and
wherein the second identification information includes at least one of a subscription manager identifier (SMID), a secure routing identifier (SRID), data preparation identifier (DPID) or an address of the profile server.

16. A server comprising:
a transceiver; and
a controller configured to:
receive, from an electronic device via the transceiver, first information associated with a routing authorization,
transmit, to the electronic device via the transceiver, second information for selecting mobile communication service,
receive, from the electronic device via the transceiver, third information associated with a mobile communication service that is selected based on the second information,
receive, from the electronic device via the transceiver, fourth information for downloading a profile,
transmit, to a profile server via the transceiver, information included in the fourth information,
receive, from the profile server via the transceiver, the profile corresponding to the fourth information, and
transmit, to the electronic device via the transceiver, the profile including at least one of an application, a file system, or an authentication key,
wherein the profile is installed to an embedded universal integrated circuit card (eUICC) of the electronic device.

17. The server of claim 16,
wherein the controller is further configured to transmit, to the electronic device via the transceiver, fifth information including at least one of an activation code or information for identifying the profile server, and
wherein the activation code or the information for identifying the profile server are determined based on the selected mobile communication service.

18. The server of claim 17,
wherein the fourth information for downloading the profile is delivered to the profile server in case that the fourth information includes at least one of the activation code or the information for identifying the profile server included in the fifth information.

19. The server of claim 16, wherein the second information includes at least one of billing information, list information of mobile communication fees, or list of mobile communication service corresponding to the mobile communication fees.

20. The server of claim 16,
wherein the profile server is identified based on at least one of the selected mobile communication service or the fourth information,
wherein the fourth information includes at least one of first identification information or second identification information,
wherein the first identification information includes at least one of a certificate, a signature, a public key, an activation code or information for the eUICC, and
wherein the second identification information includes at least one of a subscription manager identifier (SMID), a secure routing identifier (SRID), data preparation identifier (DPID) or an address of the profile server.

* * * * *